(12) United States Patent
Arel et al.

(10) Patent No.: US 11,263,524 B2
(45) Date of Patent: *Mar. 1, 2022

(54) HIERARCHICAL MACHINE LEARNING SYSTEM FOR LIFELONG LEARNING

(71) Applicant: International Business Machines Corporation, Armonk, NY (US)

(72) Inventors: Itamar Arel, Los Altos, CA (US); Joshua Benjamin Looks, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 536 days.

This patent is subject to a terminal disclaimer.

(21) Appl. No.: 16/197,017

(22) Filed: Nov. 20, 2018

(65) Prior Publication Data

US 2019/0279105 A1 Sep. 12, 2019

Related U.S. Application Data

(63) Continuation of application No. 15/914,955, filed on Mar. 7, 2018, now Pat. No. 10,162,794.

(51) Int. Cl.
*G06N 3/08* (2006.01)
*G06K 9/62* (2022.01)
(Continued)

(52) U.S. Cl.
CPC .............. *G06N 3/08* (2013.01); *G06K 9/627* (2013.01); *G06K 9/6217* (2013.01);
(Continued)

(58) Field of Classification Search
None
See application file for complete search history.

(56) References Cited

U.S. PATENT DOCUMENTS

| 5,835,901 A | 11/1998 | Duvoisin, III et al. |
| 10,055,685 B1 | 8/2018 | Arel et al. |

(Continued)

OTHER PUBLICATIONS

Lee et al., Lifelong Learning with Dynamically Expandable Networks, arXiv:1708.01547v2 [cs.LG], Aug. 2017, pp. 1-9 (Year: 2017).*

(Continued)

*Primary Examiner* — Alan Chen
(74) *Attorney, Agent, or Firm* — Anthony Curro

(57) ABSTRACT

Embodiments described herein cover a hierarchical machine learning system with a separated perception subsystem (that includes a hierarchy of nodes having at least a first layer and a second layer) and application subsystem. In one example embodiment a first node in the first layer processes a first input and processes at least a portion of the first input to generate a first feature vector. A second node in the second layer processes a second input comprising at least a portion of the first feature vector to generate a second feature vector. The first node generates a first sparse feature vector from the first feature vector and/or the second node generates a second sparse feature vector from the second feature vector. A third node of the perception subsystem then processes at least one of the first sparse feature vector or the second sparse feature vector to determine an output.

22 Claims, 17 Drawing Sheets

(51) Int. Cl.
G06N 20/00 (2019.01)
G06N 3/04 (2006.01)
(52) U.S. Cl.
CPC ......... *G06K 9/6249* (2013.01); *G06K 9/6272* (2013.01); *G06K 9/6284* (2013.01); *G06N 3/0445* (2013.01); *G06N 3/0454* (2013.01); *G06N 3/084* (2013.01); *G06N 20/00* (2019.01)

(56) References Cited

U.S. PATENT DOCUMENTS

| | | | |
|---|---|---|---|
| 10,162,794 B1 * | 12/2018 | Arel | G06K 9/6217 |
| 2003/0149676 A1 | 8/2003 | Kasabov | |
| 2013/0325862 A1 | 12/2013 | Black | |
| 2014/0278379 A1 | 9/2014 | Coccaro et al. | |
| 2017/0061328 A1 | 3/2017 | Majumdar et al. | |
| 2017/0213150 A1 | 7/2017 | Arel et al. | |
| 2018/0121799 A1 | 5/2018 | Hashimoto et al. | |

OTHER PUBLICATIONS

Zenke et al., Continual Learning Through Synaptic Intelligence, arXiv:1703.04200v3 [cs.LG], Jun. 2017, Total pp. 10 (Year: 2017).*
Srivastava et al., Compete to Compute, Technical Report No. IDSIA-04-13, Dalle Molle Institute for Artificial Intelligence, Jun. 2013, Total pp. 13 (Year: 2013).*
Kirkpatrick, J., et al. "Overcoming catastrophic forgetting in neural networks," Proceedings of the National Academy of Sciences, Mar. 28, 2017, pp. 3521-3526, vol. 114, No. 13.
Goodrich, B.F., "Neuron Clustering for Mitigating Catastrophic Forgetting in Supervised and Reinforcement Learning" PhD Dissertation, University of Tennessee, Dec. 2015, 116 pages.
Goodrich, B. et al., "Neuron Clustering for Mitigating Catastrophic Forgetting in Feedforward Neural Networks", Symposium on Computational Intelligence in Dynamic and Uncertain Environments (CIDUE) Dec. 9, 2014, 7 pages, IEEE.
Goodrich, B. et al., "Unsupervised neuron selection for mitigating catastrophic forgetting in neural networks", in Proc. Of the Int. Symp. On Circuits and Systems, Aug. 2014, pp. 997-1000.
Albesano, D. et al., "Adaptation of Artificial Neural Networks Avoiding Catastrophic Forgetting", 2006 International Joint Conference on Neural Networks, Jul. 16-21, 2006, pp. 1554-1561, IEEE.
Markou, M. et al., "Novelty detection: a review—part 2: neural network based approaches", Elsevier Signal Processing, Jul. 4, 2003, 23 pages.
Coop, R.A., "Mitigation of Catastrophic Interference in Neural Networks and Ensembles using a Fixed Expansion Layer", Doctoral Dissertation, Univeristy of Tennessee, Aug. 2013, 87 pages.
Tay, A.L.P. et al., "The Hierarchical Fast Learning Artificial Neural Network (HieFLANN)—An Autonomous Platform for Hierarchical Neural Network Construction", IEEE Transactions on Neural Networks, Nov. 6, 2007, pp. 1645-1657, vol. 18, No. 6.
French, R.M., "Dynamically constraining connectionist networks to produce distributed, orthogonal representations to reduce catastrophic interference", Proceedings of 16th Annual Cognitive Science Society Conference, 1994, network, 1111, 6 pages.
Non-Final Office Action for U.S. Appl. No. 15/785,270 dated Apr. 25, 2018.
Final Office Action for U.S. Appl. No. 15/785,270 dated Jun. 11, 2018.
Notice of Allowance for U.S. Appl. No. 15/785,270 dated Jun. 5, 2018.
Non-Final Office Action for U.S. Appl. No. 15/890,196 dated Jun. 22, 2018.
Final Office Action for U.S. Appl. No. 15/890,196 dated Dec. 11, 2018.
Non-Final Office Action for U.S. Appl. No. 15/914,955 dated Jun. 25, 2018.
Notice of Allowance for U.S. Appl. No. 15/914,955 dated Nov. 1, 2018.

* cited by examiner

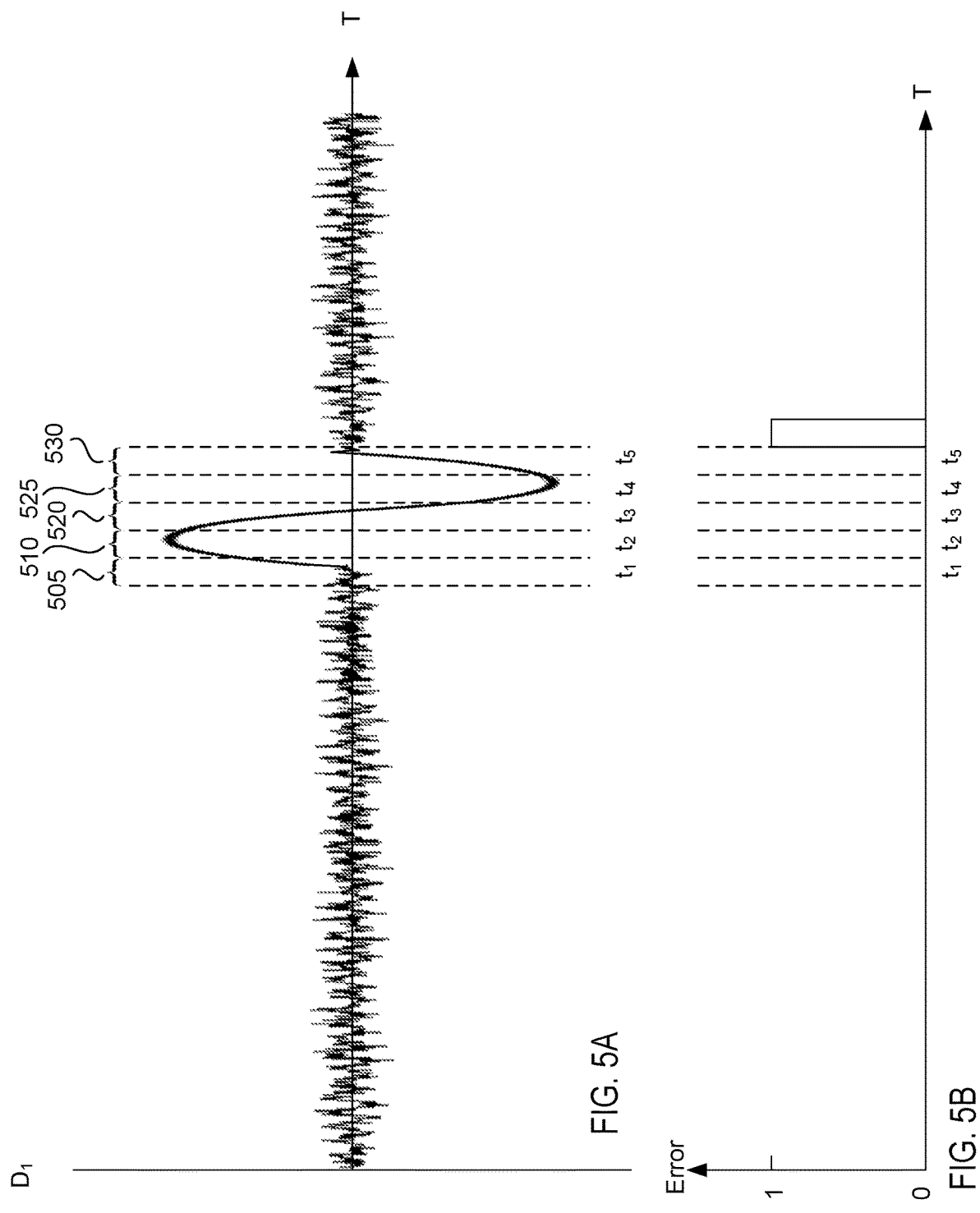

HIERARCHICAL MACHINE LEARNING SYSTEM FOR LIFELONG LEARNING

RELATED APPLICATIONS

The present application is a continuation of U.S. patent application Ser. No. 15/914,955, filed Mar. 7, 2018, which is incorporated by reference herein.

TECHNICAL FIELD

This disclosure relates to the field of artificial intelligence and machine learning, and in particular to a hierarchical machine learning system capable of lifelong learning.

BACKGROUND

Contemporary machine learning paradigms, such as most neural network architectures, deep learning architectures and their governing supervised learning algorithms, consist of a single system that includes a feature representation component with a classifier or regression layers that map features to a desired output space. A convolutional neural network (CNN), for example, hosts multiple layers of convolutional filters, pooling and non-linearities in its lower layers, on top of which a multi-layer perceptron is commonly appended, mapping the top layer features extracted by the convolutional layers to decisions (e.g. classification outputs). Training is achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved only if a sufficiently large and diverse training dataset is made available. In the absence of sufficient number of labeled examples in the training dataset, or lack of diverse examples, the network accuracy often degrades below a desired level of performance.

There are several key limitations to supervised learning, particularly when applied to large parametric models (such as contemporary deep learning architectures). The first is commonly referred to as catastrophic forgetting—a problem that affects artificial neural networks as well as many other supervised learning systems. When trained with novel patterns, neural networks tend to quickly unlearn (or forget) prior representations and their mapping to outputs. Traditionally, neural network training is structured in a way that helps mitigate this effect. When learning in stationary settings, training data is generally shuffled and presented in a random order. The data presentation is stationary in that samples are drawn in an independent and identically distributed manner. If the data is presented in a manner that is non-stationary, the network may not be able to capture and retain representations that are presented at different time intervals. Traditionally, dynamic environments (environments in which labels change and/or new labels are added) have been recognized as tasks that are challenging for neural networks. If the task or environment changes (e.g., new labels are added), a neural network tends to catastrophically forget the previously learned task or environment setting (how to classify inputs using the original labels) as it learns how to classify inputs pertaining to the new labels. In other words, the network weights (parameters) of a machine learning system tune to accommodate the recent statistics of the input data, thereby "forgetting" prior representations.

Catastrophic forgetting renders lifelong learning unachievable for conventional machine learning architectures. Accordingly, to date machine learning systems have been unable to progressively learn new representations while not unlearning prior ones in a principled scalable manner.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 5A is a graph illustrating an input signal received by a node of a machine learning architecture, in accordance with embodiments of the present disclosure.

FIG. 5B is a graph illustrating error associated with an output signal of a second node of the machine learning architecture after the input signal of FIG. 5A has been processed, in accordance with embodiments of the present disclosure.

DETAILED DESCRIPTION

Figure 1:
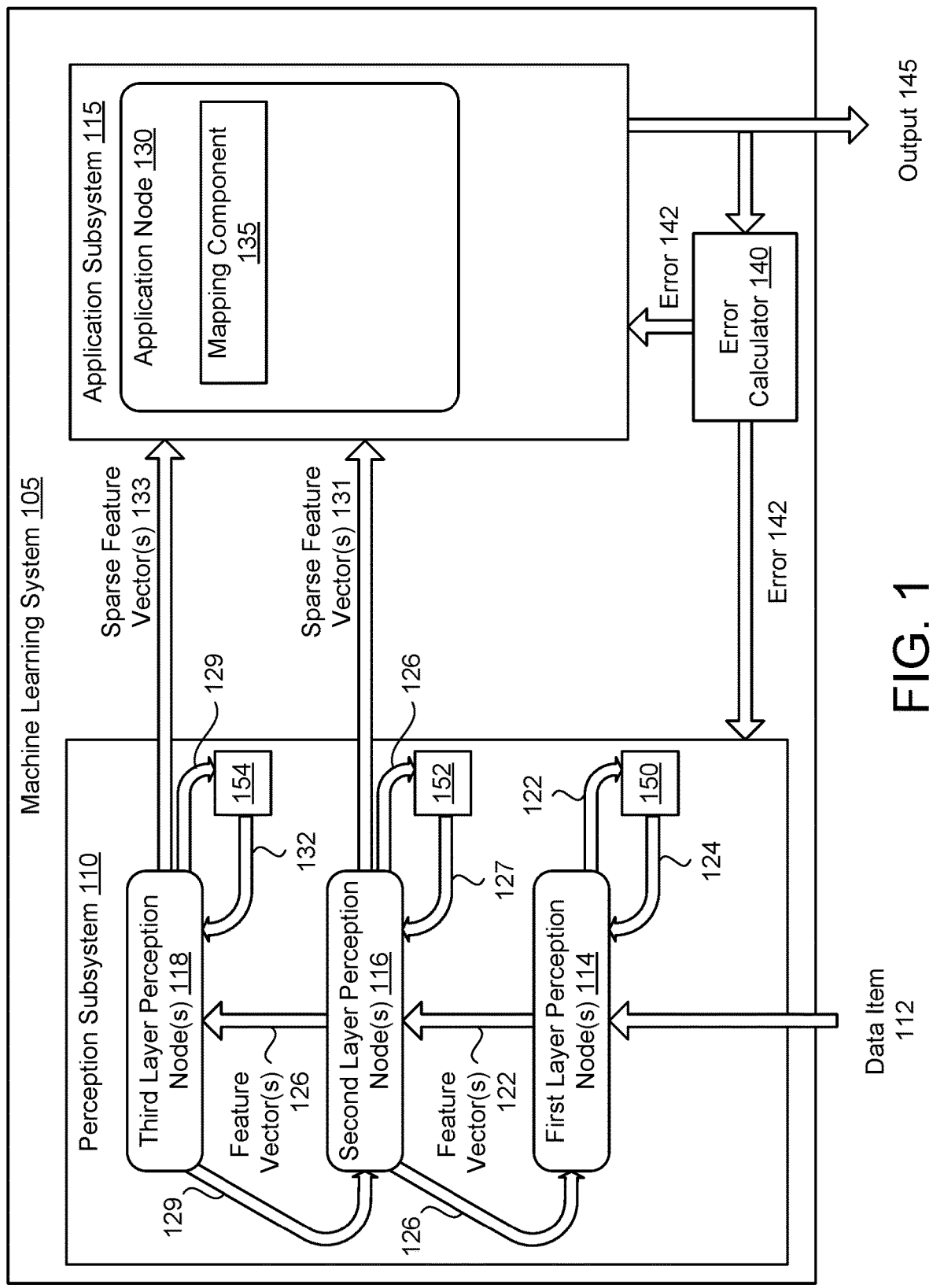
FIG. 1 is a block diagram illustrating an architecture for a machine learning system, in accordance with embodiments of the present disclosure.

Embodiments of the present disclosure relate to a new hierarchical machine learning architecture capable of achieving one or more of lifelong learning, sample-efficient learning, semi-supervised learning and localized learning for spatial information, temporal information and spatio-temporal information.

Lifelong learning refers to the ability of a machine learning system to continue to learn new input-output mappings, and construct new internal representations, without forgetting previously learned representations and their corresponding outputs. In traditional machine learning architectures, such as artificial neural networks, a neural network may be trained using a training dataset to generate a fixed number of outputs (e.g., to classify input images as belonging to a fixed number of classes). However, in order to train the neural network to generate a new output (e.g., to classify a new type of image), the training process generally needs to be redone using the entire original training dataset plus new data items associated with the new output. Failure to restart the training process for traditional machine learning systems generally results in catastrophic forgetting, in which the accuracy associated with previously trained outputs drops precipitously.

One type of traditional machine learning architecture is a recurrent neural network (RNN). An RNN is a type of neural network that includes a memory to enable the neural network to capture temporal dependencies. An RNN is able to learn input-output mappings that depend on both a current input and past inputs. RNNs may be trained using a training dataset to generate a fixed number of outputs (e.g., to classify time varying data such as video data as belonging to a fixed number of classes). However, in order to train the RNN to generate a new output (e.g., to classify a new type of activity), the training process generally needs to re-introduce samples from the previously learned classes using the entire original training dataset plus new data items associated with the new output. Failure to restart the training process for traditional RNNs generally results in catastrophic forgetting, in which the accuracy associated with previously trained outputs drops precipitously.

Embodiments describe a machine learning system with a memory component that is capable of achieving lifelong learning (learning progressively) for data sets exhibiting temporal dependency and/or spatial dependency, thereby mitigating the effects of catastrophic forgetting. As a result, machine learning systems described herein are capable of learning to produce new temporal-dependent outputs as well as temporal-independent outputs with high accuracy without forgetting how to produce previously learned outputs and without degrading the accuracy associated with such previously learned outputs.

In an example of catastrophic forgetting associated with traditional machine learning architectures, an RNN may be trained to classify a sequence of images as containing a walking person or a running person. After training the RNN using a training dataset that contains sequences of labeled images of people running and walking, the RNN is able to classify new sequences of images as containing a walking person or a running person with high accuracy. If a new labeled dataset of a skipping person and a dancing person is introduced and used to further train the RNN, that RNN will learn to classify skipping people and dancing people, but will forget how to classify running and walking people, thus resulting in catastrophic forgetting. In particular, the weights or properties of each node in the RNN are adjusted during the initial training to enable the RNN to identify running and walking. However, those weights are all changed during the further training to teach the neural network to identify skipping and dancing. The changed weights essentially erase the earlier training for identifying running and walking.

Embodiments described herein mitigate the problem of catastrophic forgetting by using techniques such as localized learning, the ability to add new representational resources (e.g., centroids) within nodes to capture new patterns in input data items, the use of a two part machine learning system that includes a perception subsystem and an application subsystem, and the use of both novelty criteria and relevancy criteria for determining when to update and allocate centroids in nodes.

Localized learning refers to the ability of one or more nodes in a machine learning system to independently determine whether they should be updated and in what manner. In traditional supervised machine learning architectures, training is achieved by computing an output by the machine learning system for an input data item and then comparing the output to a known target associated with the input data item. The difference between the known target and the determined output is then used to determine an error, and the error is used to obtain a global loss function, which in turn is used to establish the gradient of said loss function with respect to the parameters in the network in order to update all of the nodes in the machine learning system. The process of propagating said global loss function gradient with respect to the network parameters, across multiple layers of the network, is commonly referred to as backpropagation. Accordingly, traditional machine learning models (e.g., neural networks such as RNNs) apply globalized learning when utilizing gradient descent to determine how the network weights are to be updated. In contrast, embodiments use one or more of sparse vectors and distinct learning rules associated with each node to achieve localized learning. In embodiments an error or other relevancy rating is broadcast to multiple nodes, and each node makes its own determination as to whether to update. Localized learning facilitates lifelong learning and sample-efficient learning in embodiments.

The globalized learning techniques used by existing machine learning architectures such as neural networks (e.g., back propagation and deep gradient descent) cause training of the machine learning architectures to be a slow process. With each new input in a training dataset, only very small updates are made to the weights of the machine learning architecture. As the parametric models that are used in neural networks become large, the update process becomes even slower. In contrast, embodiments of the present disclosure apply a machine learning architecture that can be trained notably faster (e.g., up to 20 times faster in some implementations), and require far fewer input presentations, than a conventional neural network.

Traditional machine learning architectures commonly learn through a process called supervised learning. In supervised learning, every data item in the training dataset has an associated target value. The target value for each data item is then used to compute an error, and the error is used to train the machine learning model. Semi-supervised learning refers to a learning process for machine learning models in which only a portion (e.g., a small portion such as 5-10%) of the data items used to train the machine learning model include targets. Embodiments of the present disclosure achieve semi-supervised learning by using techniques such as localized learning of nodes, the ability to add new resources (e.g., centroids) within nodes to identify new patterns in input data items, the use of a two-part machine learning system that includes a perception subsystem and an application subsystem, and the use of both novelty criteria and relevancy criteria for determining when to update weights of centroids in nodes.

A machine learning system in embodiments may include a perception subsystem and an application subsystem, where the perception subsystem comprises a hierarchy of nodes that includes at least a first layer and a second layer. The first layer may be a bottom layer of the hierarchy or an intermediate layer of the hierarchy. In one embodiment, a first node in the first layer of the hierarchy of nodes receives a first input. The first input includes an external input, which may be a feature vector from a lower level node in the hierarchy of nodes or at least a portion of a data item (if the first node is in the bottom layer of the hierarchy). The first input may additionally include a first previously generated feature vector that was previously generated by the first node and/or one or more additional previously generated feature vectors that were previously generated by a node or nodes in the second layer of the hierarchy of nodes. The first node processes at least a portion of the first input to generate a first feature vector, the first feature vector comprising a first plurality of feature elements.

The first node passes the first feature vector to one or more nodes in the second layer of the hierarchy. A second node in the second layer of the hierarchy then processes a second input comprising at least a portion of the first feature vector. The second input may additionally include a previously generated feature vector that was previously generated by the second node and/or one or more additional previously generated feature vectors that were generated by one or more nodes in a next layer in the hierarchy (if the second layer is not a top layer in the hierarchy). The second node processes the second input to generate a second feature vector, the second feature vector comprising a second plurality of feature elements.

The first node may generate a first sparse feature vector from the first feature vector. Additionally, the second node may generate a second sparse feature vector from the second feature vector. The first node may send the first sparse feature vector to a third node of the application subsystem. Additionally, the second node may send the second sparse feature vector to the third node. One or more other nodes in the first layer, the second layer and/or one or more additional layers of the hierarchy may also generate sparse feature vectors and send those sparse feature vectors to the third node. For each sparse feature vector, a majority of feature elements in the sparse feature vector have a value of zero. The third node processes the received sparse feature vectors to determine an output. The application subsystem may additionally determine a relevancy rating based on the output (e.g., based on an error and/or confidence associated with the output), and may propagate the relevancy rating to the nodes in the perception subsystem. Each node in the perception subsystem may compute a novelty rating, and may determine whether to make any updates within the node based on the locally determined novelty rating and the received relevancy rating.

Referring now to the figures, FIG. 1 is a block diagram illustrating an architecture for a machine learning system 105, in accordance with embodiments of the present disclosure. The machine learning system 105 comprises two complementing subsystems: a perception subsystem 110 that contains a hierarchy of perception nodes and an application subsystem 115 that contains an application node 130. The hierarchy of perception nodes includes multiple layers, where each layer includes one or more perception nodes. In the illustrated example, the hierarchy of perception nodes includes a first layer, a second layer and a third layer. The first layer includes one or more first layer perception nodes 114, the second layer includes one or more second layer perception nodes 116, and the third layer includes one or more third layer perception nodes 118. In alternative embodiments, the perception subsystem 110 may include a hierarchy with greater or fewer layers. For example, a perception subsystem may include only two layers of nodes or may include up to tens of layers, hundreds of layers, thousands of layers, and so on.

The role of the perception nodes 114, 116, 118 in the perception subsystem 110 is to receive streams of multi-dimensional sensory inputs (e.g., data items 112 and/or representations (e.g., feature vectors) generated from other perception nodes in the perception subsystem 110), which may originate from one or more modalities (e.g., audio inputs, 2D image inputs, 3D image inputs, text inputs, and so on), and form representations (e.g., feature vectors) that capture the salient attributes of said inputs and/or received representations such that the application node 130 can receive said representations as inputs and map those to desired outputs. Different arrangements may be used to connect perception nodes between layers. In some embodiments, all perception nodes of one layer are connected to all perception nodes of the next layer. For example, all first layer perception nodes 114 may be connected to all second layer perception nodes 116. Perception nodes between layers may also be connected in a one-to-one arrangement, a one-to-many arrangement, a many-to-one arrangement, a many-to-many arrangement, and so on. In some embodiments, higher layers in the hierarchy of nodes have fewer nodes than lower layers in the hierarchy. Each node in a particular layer in the hierarchy may be connected to multiple nodes at a lower layer in the hierarchy.

In an example, the perception subsystem may include three first layer perception nodes 114, two second layer perception nodes 116 and one third layer perception node 118. First layer perception nodes one and two may connect to second layer perception node one, and first layer perception nodes two and three may connect to second layer perception node two. Second layer perception nodes one and two may connect to the third layer perception node.

The streams of multi-dimensional inputs received by the perception subsystem 110 may include temporal dependencies and/or temporal patterns (e.g., regularities over time).

The representations (e.g., feature vectors) generated by the first layer perception nodes 114, second layer perception nodes 116, third layer perception nodes 118, and so on, may capture spatial information (e.g., regularities within a single input) as well as temporal information (e.g., regularities spanning multiple inputs) and/or spatio-temporal information (e.g., regularities within inputs as well as regularities between inputs). Many types of inputs exhibit temporal patterns as well as spatial patterns. Some examples include audio data (e.g., audio data containing speech (e.g., a sequence of utterances or phonemes, or music), video data, stock market value data, temperature data, and so on.

The first layer perception nodes 114 capture regularities from incoming data items and produce representations based on the learned regularities. The second layer perception nodes 116 capture regularities that are present in the representations generated by the first layer perception nodes 114 and generate additional representations based on those learned regularities. The third layer perception nodes 118 capture regularities that are present in the representations generated by the second layer perception nodes 116. Some or all of the perception nodes in the perception subsystem 110 generate sparse versions of their generated representations and provide the sparse representations to the application subsystem 115. The application node 130 (or multiple application nodes) of the application subsystem 115 then generates an output based on the received sparse representations. Without loss of generality, the application node output can be in the form of classification decisions, predicted values (i.e. regression output) or actions to be applied to an environment with which the machine learning system 105 interacts.

In embodiments, the perception subsystem 110 receives an input data item 112 at a time t. The perception subsystem 110 may partition the data item 112 into portions (e.g., patches), and each portion of the data item may be provided to a different perception node of the first layer perception nodes 114.

A first layer perception node 114 receives a portion of the data item 112, which is used to generate a feature vector. If the machine learning system 105 is a recurrent machine learning system, then the first layer perception node 114 also stores a previously generated feature vector and uses the previously generated feature vector in generating a current feature vector. For example, the first layer perception node 114 may additionally receive a previously generated feature vector 124 at time t. The previously generated feature vector 124 may have been generated by the first layer perception node 114 at time t−1 and sent to a delay (or feedback) module 150. The previously generated feature vector 124 may then be fed back into the first layer perception node 114 with a one unit time delay (e.g., at time t). The portion of the data item 112 and the previously generated feature vector 124 may form a combined input for the first layer perception node 114. Additionally, or alternatively, the first layer perception node 114 may receive one or more previously generated feature vectors 126 that were generated by one or more second layer perception nodes 116 at the time t−1. In one embodiment, each of the second layer perception nodes 116 that a particular first layer perception node 114 is connected to provides a previously generated feature vector to the particular first layer perception node 114. Accordingly, the portion of the data item 112, the previously generated feature vector 124 and the one or more previously generated feature vectors 126 may form a combined input for the first layer perception node 114.

Each first layer perception node 114 may include a clustering layer that processes the received portion of the data item 112, the previously generated feature vector 124 (or portions thereof), and/or the previously generated feature vectors 126 (or portions thereof) to generate a feature vector 122 at time t, which may be viewed as a representation of the combined input comprising at least a portion of the data item 112, at least a portion of the previously generated feature vector 124, and/or at least a portion of the previously generated feature vectors 126.

In an example, if the received portion of the input data item 112 that is received by a particular first layer perception node 114 has 10 dimensions, there are 6 centroids in the first layer perception node 114 (causing the feature vector to be a 6 dimensional feature vector that has 6 feature elements), the first layer perception node 114 receives feature vectors 126 from three second layer perception nodes 116, and each received feature vector 126 is a 4 dimensional feature vector, then the combined input may be a 28 dimension input. The clustering layer of the first layer perception node 114 may output the feature vector 122 to the delay module 150 so that the feature vector 122 can be input back into the first layer perception node 114 along with a portion of a new data item and/or further feature vectors 126 from the second layer perception nodes 116 at the next time interval t+1.

In some embodiments, the feature vectors 126 received from the second layer perception nodes 116 are not full feature vectors. For example, the feature vectors 126 may be sparse feature vectors. In some embodiments, first layer perception nodes 114 do not receive feature vectors 126 or use the feature vectors 126 as an input. Additionally, in some embodiments first layer perception nodes 114 do not store feature vectors 122 or use previously generated feature vectors 124 as an input.

By using a portion of a current input data item 112 and a previously generated feature vector 124 (generated from a portion of a previous data item) as a combined input, spatio-temporal and temporal regularities can be captured as well as spatial regularities. Accordingly, patterns that repeat over time (possibly with variability) such as words, speech, gestures, videos, temperature, weather, stock market values, and so on may be captured. Patterns across a sequence of input data items are captured in a single feature vector in embodiments. For example, a current feature vector 122 is based on a current data item and a previous feature vector, where the previous feature vector was based on a previous data item and an older previous feature vector, where that older previous feature vector was based on an older previous data item and a still older previous feature vector, and so on. In some embodiments, a current feature vector 122 includes information for previous data items that were received up to 8-10 time steps into the past.

By having higher layer perception nodes provide their representations back to lower layer perception nodes, two benefits may be achieved. The first benefit is that perception nodes essentially remember further into the past (i.e., current representations are dependent on inputs from a greater number of time steps into the past). In some embodiments (e.g., in which feature vectors 126 are included as input for first layer perception nodes 114), a current feature vector 122 includes information for previous data items that were received more than 20 time steps into the past. The second benefit is that representations from higher layer perception nodes may help with disambiguation. For example, without feedback from a higher layer perception node, a perception node may generate a representation that indicates a 50% match to centroid A and a 50% match to centroid B (e.g., 50% chance cat face, 50% chance dog face). However, the next layer perception node or nodes may generate an output that indicates a regime associated with centroid A. For example, the next layer perception node may generate a representation that indicates a cat. This representation may be used by the lower layer perception node to weight centroid A (cat face) more highly than centroid B (dog face). Accordingly, by providing feedback from higher layer nodes to lower layer nodes, the lower layer nodes gain information that indicates further context that is usable to disambiguate the representations generated by the lower layer perception nodes.

In embodiments, patterns that repeat over time (possibly with variability) such as words, speech, gestures, videos, temperature, weather, stock values, and so on may be captured. Patterns across a sequence of input data items are captured by feature vectors of the first layer perception nodes 114 in embodiments. For example, a current feature vector 122 is based on a portion of a current data item, a previous feature vector 124 and one or more previous feature vectors 126, where the previous feature vector 124 was based on a portion of a previous data item, and one or more previous feature vectors, and so on.

In embodiments, each centroid of a first layer perception node 114 may represent a particular state of the dynamical system and may act as an attractor of the dynamical system represented. In embodiments, the previous feature vector 124 that was delayed by one or more time units represents a previous state of the dynamical system and the input data item 112 acts as an excitation. The input data item 112 may cause a buildup of excitation that may cause a state transition at one or more first layer perception nodes 114. The state transition may occur when the combined input of the data item 112 and the previous feature vector 124 and/or feature vectors 126 causes a generated feature vector 122 to be most similar to a different centroid than the previous feature vector 124.

For each first layer perception node 114, a sparsity layer of the first layer perception node 114 may then process the feature vector 122 to generate a sparse feature vector. In one embodiment, the sparsity layer selects one or more feature element (also referred to as an index) of the feature vector 122 having a highest feature element value, and replaces the values of all unselected feature elements (indexes) with zeros to generate the sparse feature vector. In one embodiment, the value of the selected feature element is compared to a threshold. If the value of the selected feature element (or feature elements) is lower than the threshold, then the value of the selected feature element(s) may also be replaced with zeros. In such an instance, the sparse feature vector contains only zeros and is referred to herein as a null inference. In an alternative embodiment, the sparse feature vector is not generated, and the feature vector 122 is instead passed to the application subsystem 115. In alternative embodiments, the first layer perception nodes 114 do not send sparse feature vectors or feature vectors 122 to the application subsystem 115.

The second layer perception nodes 116 receive feature vectors 122 from the first layer perception nodes 114. As indicated above, numerous different schemes may be used to connect second layer perception nodes 116 to first layer perception nodes 114 (e.g., one-to-one, one-to-many, many-to-many, and so on). Each second layer perception node 116 may receive feature vectors 122 from those first layer perception nodes 114 to which it is connected. The second layer perception nodes 116 may then each generate feature vectors based on the feature vectors received from the first layer perception nodes 114. Additionally, each second layer perception node 116 may take into consideration a feature vector 127 previously generated by that second layer perception node and/or feature vectors 129 received from one or more third layer perception nodes 118. Each second layer perception node 116 may generate a feature vector 126 and provide that feature vector 126 to one or more third layer perception nodes 118. Each second layer perception node 116 may additionally second the feature vector 126 to a delay module 152 and/or to one or more first layer perception nodes 114.

For each second layer perception node 116, a sparsity layer of the second layer perception node 116 may then process the feature vector 126 to generate a sparse feature vector 131. In one embodiment, the sparsity layer selects one or more feature element of the feature vector 126 having a highest feature element value, and replaces the values of all unselected feature elements (indexes) with zeros to generate the sparse feature vector. In one embodiment, the value of the selected feature element is compared to a threshold. If the value of the selected feature element (or feature elements) is lower than the threshold, then the value of the selected feature element(s) may also be replaced with zeros. The second layer perception nodes 116 may then send the sparse feature vectors 131 to the application subsystem 115. In an alternative embodiment, the sparse feature vectors 131 are not generated, and the feature vectors 126 are instead passed to the application subsystem 115. In alternative embodiments, the second layer perception nodes 116 do not send feature vectors 126 or sparse feature vectors 131 to the application subsystem 115.

The third layer perception nodes 118 receive feature vectors 126 from the second layer perception nodes 116. As indicated above, numerous different schemes may be used to connect third layer perception nodes 118 to second layer perception nodes 116 (e.g., one-to-one, one-to-many, many-to-many, and so on). Each third layer perception node 118 may receive feature vectors 126 from those second layer perception nodes 116 to which it is connected. The third layer perception nodes 118 may then each generate feature vectors 129 based on the feature vectors 126 received from the second layer perception nodes 116. Additionally, each third layer perception node 118 may take into consideration a feature vector 131 previously generated by that third layer perception node. Each second third perception node 118 may generate a feature vector 129 and provide that feature vector 126 to a delay module 154 and/or to one or more second layer perception nodes 116.

For each third layer perception node 118, a sparsity layer of the third layer perception node 118 may then process the feature vector 129 to generate a sparse feature vector 133. In one embodiment, the sparsity layer selects one or more feature element of the feature vector 129 having a highest feature element value, and replaces the values of all unselected feature elements (indexes) with zeros to generate the sparse feature vector. In one embodiment, the value of the selected feature element is compared to a threshold. If the value of the selected feature element (or feature elements) is lower than the threshold, then the value of the selected feature element(s) may also be replaced with zeros. The third layer perception nodes 118 may then send the sparse feature vectors 133 to the application subsystem 115. In an alternative embodiment, the sparse feature vectors 133 are not generated, and the feature vectors 129 are instead passed to the application subsystem 115.

In embodiments, as the hierarchy of nodes in the perception system is ascended, each node grows in scope but loses detail. Accordingly, each layer may have its own spatial and temporal scope. For example, the first layer perception nodes may have a narrow scope but a high level of detail, the second layer perception nodes may have slightly less detail and slightly broader scope, and so on until the top layer which has the highest level of scope but the lowest level of detail. The increased scope and decreased detail may be increased scope in terms of number of time steps considered as well as amount of spatial information considered. Similarly, the decreased detail may include decreased detail in terms of temporal information (e.g., exactly how many time steps back a particular pattern occurred) as well as spatial information.

If the second layer perception nodes 116 do not provide representations back to the first layer perception nodes 114, then the second layer perception nodes 116 may generate representations based on input (e.g., representations from the first layer perception nodes) from up to 14-15 time steps in the past. Additionally, the first layer perception nodes 114 may generate representations based on inputs from up to 8-10 time steps in the past. However, if representations from higher layer perception nodes are used as an input for lower layer perception nodes (e.g., representations generated by the second layer perception nodes 116 are provided as inputs to the first layer perception nodes 114), then current representations generated by the first layer perception nodes 114 may be affected by past input that is more than 8-10 time steps in the past. This results in a super-linear increase in temporal scope with respect to the layers. For example, the first layer perception nodes 114 may generate representations that are based on inputs from up to about 24 time steps in the past. Additionally, the second layer perception nodes 116 may receive representations from the first layer perception nodes 114 and the third layer perception nodes 118, which may cause the second layer perception nodes 116 to generate representations that are based on inputs from even more time steps in the past. Similarly, the third layer perception nodes 118 may generate representations that are based on inputs from still further time steps in the past. The representations (e.g., feature vectors) generated by the first layer perception nodes 114, second layer perception nodes 116 and third layer perception nodes 118 are strongly dependent on their recent inputs, and less strongly dependent on third past inputs. The older an input is, the weaker the effect it has on a current representation generated by a perception node.

As shown, sparse feature vectors 131 are passed to the application subsystem 115 by the second layer perception nodes 116 and sparse feature vectors 133 are passed to the application subsystem 115 by third layer perception nodes 118. However, the first layer perception nodes 114 do not pass sparse feature vectors to the application subsystem 115 in the illustrated example. In other examples with more than three layers of perception nodes, one or more bottom most layers may not pass sparse feature vectors to the application subsystem 115. For example, in a 15 layer hierarchy the first three layers of perception nodes may not pass sparse feature vectors to the application subsystem 115. This is because the lowest layer nodes generally generate feature vectors that represent micro-patterns that are common across many different inputs. For example, for images the lowest layers of perception nodes may generate micro-patterns of curves, edges, lines, etc. that are shared by most images. Accordingly, it may not be useful for the lowest layers of perception nodes to pass sparse feature vectors to the application subsystem 115.

Conceptually, perception nodes at some layers (e.g. the top three layers) of the hierarchy of nodes may break down the input space for those perception nodes into regimes. Inputs associated with one regime should invoke first representations, while inputs from another regime should invoke different second representations. By recognizing different regimes within the input space, the perception subsystem 110 is able to treat each regime separately (e.g., update centroids associated with one regime without updating centroids associated with another centroid) without affecting the other regimes. Such targeted learning that affects only a small subset of the nodes and/or a small subset of the centroids within nodes without affecting other nodes and/or centroids is not possible under traditional machine learning architectures. The different regimes are captured in embodiments using a combination of detecting novelty and relevancy, and triggering assignment and/or updating of centroids within nodes based on the novelty and relevancy. These concepts are discussed in greater detail below. An end result is that two patterns that correspond to different underlying causes (e.g., different types of inputs) will invoke different combinations of sparse encodings (sparse feature vectors).

The sparse feature vectors 131, 133 (or feature vectors 126, 129) are provided to the application subsystem 115 and are input into an application node 130 of the application subsystem 115. The application node 130 includes a mapping component 135 that maps the sparse feature vectors 131, 133 into an output space of possible outputs to generate an output 145 associated with the input data item 112. In embodiments, the output space is not fixed, and at any time the output space of possible outputs may expand to include new possible outputs. In embodiments, the output 145 comprises a score or probability for each possible output in the output space. The possible output with the highest score or probability may be selected.

The application subsystem 115 may be trained to perform numerous different types of activities (e.g., to produce numerous different types of outputs). Some example application subsystems 115 include a classifier, a predictor, and a controller. A classifier learns to classify input data items as belonging to a particular class from among a group of possible classes. For example, an image classifier might classify an input data item as a dog, a cat, a horse, a person, a car, and so on. Notably, in embodiments the number of classes that a classifier can distinguish between is not fixed, and the classifier can continually learn to classify new types of inputs as belonging to new classes without forgetting previous classifications.

A predictor attempts to predict a next value (e.g., a next data item) in a data sequence based on an input data item and possibly previous input data items. A predictor may learn to predict a particular outcome based on a given set of observations. Examples of predictors are time series predictors that predict next words in a sentence based on previous words, predictors that predict next frames in a video based on previous frames, predictors that predict next stock market values based on previous stock market values and other data, and so on. Notably, in embodiments the number of different predictions that may be output can grow over time.

A controller may learn to issue actions that will impact an environment based on input data items. In an example, a controller may be used to determine when an automated (self-driving) car should speed up, slow down, turn, and so on.

In some instances the data item 112 may include a target that identifies a correct output associated with the data item

112. If the data item 112 included a target, then the output 145 may be compared to the target at error calculator 140 to generate an error 142, as is discussed in greater detail below. The error 142 may be sent to the application node 130 to update the application node (e.g., to update weights in the application node associated with one or more feature elements or indexes). The error 142 may also be sent to some or all of the perception nodes (e.g., to first layer perception nodes 114, second layer perception nodes 116 and third layer perception nodes 118). Each perception node may then determine whether to update one or more representations or states (e.g., centroids) of that perception node. The update mechanisms for the perception nodes 114, 116, 118 and the application node 130 may differ, as is set forth in greater detail below.

An example embodiment has been shown in FIG. 1 that includes three layers of perception nodes and a single application node 130. However, it should be understood that in alternative embodiments the perception subsystem 110 may include greater or fewer numbers of layers and/or the application subsystem 115 may contain multiple nodes.

Figure 2A:
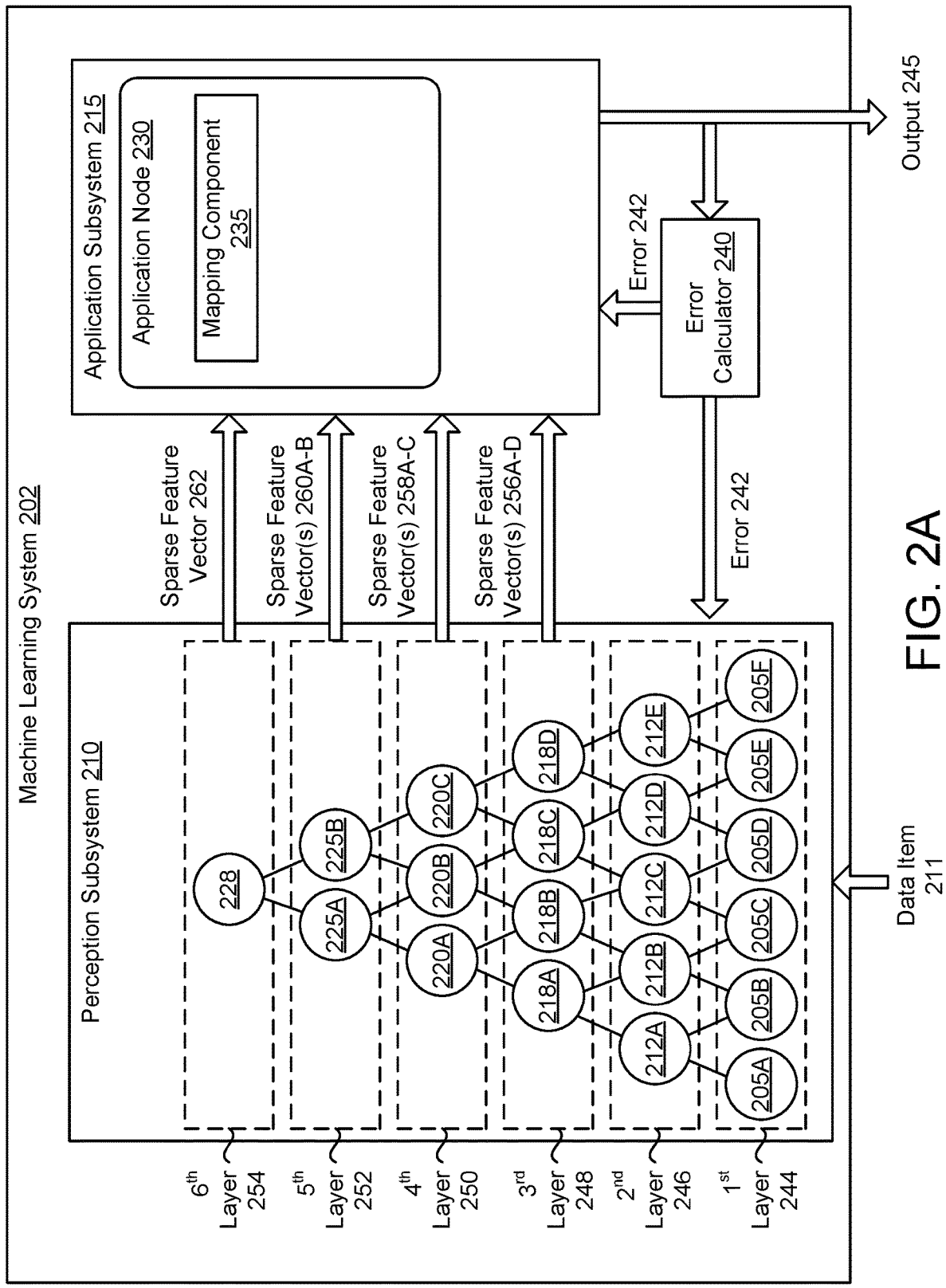
FIG. 2A is a block diagram illustrating an architecture for a machine learning system, in accordance with embodiments of the present disclosure.

FIG. 2A is a block diagram illustrating an architecture for a machine learning system 202, in accordance with embodiments of the present disclosure. Machine learning system 202 is similar to machine learning system 105, where machine learning system 202 includes a perception subsystem 210, an application subsystem 215 and an error calculator 240. However, in contrast to perception subsystem 110, perception subsystem 210 includes a hierarchical arrangement of six layers of perception nodes, including a first layer 244, second layer 246, third layer 248, fourth layer 250, fifth layer 252 and sixth layer 254. In alternative embodiments, the perception subsystem 210 may have greater or fewer layers of perception nodes.

In the illustrated example, the first layer 244 includes perception nodes 205A-F, the second layer 246 includes perception nodes 212A-E, the third layer 248 includes perception nodes 218A-D, the fourth layer 250 includes perception nodes 220A-C, the fifth layer 252 includes perception nodes 225A-B and the sixth layer includes perception node 228. However, each layer 244-254 may include greater or fewer perception nodes. As shown, each perception node from a layer higher than the first layer is connected to two perception nodes of the next lowest layer. For example, perception node 212A is connected to both perception node 205A and perception node 205B. However, perception nodes may be connected to more or fewer than two perception nodes of a lower layer. Additionally, the interconnectedness of perception nodes may very between layers and/or between nodes. For example, a perception node of the second layer 246 may be connected to four perception nodes of the first layer 244, and a perception node of the third layer 248 may be connected to two perception nodes of the second layer 246.

Additionally, as shown, many perception nodes from all but the top layer are connected to more than one perception node in the next higher layer. For example, perception node 205B is connected to both perception node 212A and perception node 212B. However, perception nodes may be connected to more or fewer than two perception nodes of a higher layer. Additionally, the interconnectedness of perception nodes may very between layers and/or between nodes. For example, a perception node of the first layer may be connected to four perception nodes of the second layer, and a perception node of the second layer may be connected to two perception nodes of the third layer.

In embodiments, a data item 211 is input at time t, and each of the first layer perception nodes 205A-F processes information for at least a portion of the data item 112. For example, the data item 112 may be partitioned into multiple parts, and each of the perception nodes 205A-F may process one of the multiple parts of the data item 112. In an example of images, an input image may be partitioned into multiple image patches (e.g., 4 pixel by 4 pixel image patches), and each perception node 114A-N may receive one of the image patches and produce a feature vector based on the contents of a received image patch.

In one embodiment, each perception node 205A-F processes a combined input comprising a portion of the data item 211, a feature vector previously generated by that perception node (from a previous input), and one or more feature vectors previously generated by one or more perception nodes at the second layer 246. Each first layer perception node 205A-F generates a feature vector as a result of processing its current input, and passes the feature vector to the perception nodes in the second layer to which the first layer perception node is connected. Each of the second layer perception nodes 212A-E then process their inputs (which may include the feature vectors received from lower layer perception nodes, a feature vector generated by the second layer perception node and/or one or more feature vectors previously generated by one or more third layer perception nodes 218A-D. Each second layer perception node 212A-E generates a feature vector as a result of processing its current input, and passes the feature vector to the perception nodes in the third layer 248 to which the second layer perception node is connected. The second layer perception nodes 212A-E may also pass their generated feature vectors to first layer perception nodes 205A-F to which they are connected.

The third layer perception nodes 218A-D process their inputs to produce additional feature vectors. The third layer perception nodes 218A-D then pass their generated feature vectors to the fourth layer perception nodes 220A-C to which they are connected. The third layer perception nodes 218A-D may also pass their generated feature vectors to second layer perception nodes 212A-E to which they are connected. Additionally, the third layer perception nodes 218A-D may each generate a sparse feature vector from their generated feature vector. The sparse feature vectors 256A-D are then passed to the application subsystem 215.

The fourth layer perception nodes 220A-C process their inputs to produce additional feature vectors. The fourth layer perception nodes 220A-C then pass their generated feature vectors to the fifth layer perception nodes 225A-B to which they are connected. The fourth layer perception nodes 220A-C may also pass their generated feature vectors to third layer perception nodes 218A-D to which they are connected. Additionally, the fourth layer perception nodes 220A-C may each generate a sparse feature vector from their generated feature vector. The sparse feature vectors 258A-C are then passed to the application subsystem 215.

The fifth layer perception nodes 225A-B process their inputs to produce additional feature vectors. The fifth layer perception nodes 225A-B then pass their generated feature vectors to the sixth layer perception node 228 to which they are connected. The fifth layer perception nodes 225A-B may also pass their generated feature vectors to fourth layer perception nodes 220A-C to which they are connected. Additionally, the fifth layer perception nodes 225A-B may each generate a sparse feature vector from their generated feature vector. The sparse feature vectors 260A-B are then passed to the application subsystem 215.

The sixth layer perception node 228 processes its inputs to produce an additional feature vector. The sixth layer perception node 228 may then pass its generated feature vector to the fifth layer perception nodes 225A-B to which it is connected. Additionally, the sixth layer perception node 228 may generate a sparse feature vector from its generated feature vector. The sparse feature vector 262 is then passed to the application subsystem 215.

In the hierarchically arranged perception subsystem 210, perception nodes in lower layers may identify low level patterns (e.g., curves, edges, lines, etc.), while perception nodes in higher layers may identify higher level patterns (e.g., animals, nature scenes, cityscapes, etc.). The information from multiple different layers may be useful in determining an output. Accordingly, from a certain layer (e.g., the third layer 248) and up perception nodes may pass representations (e.g., sparse feature vectors) to the application subsystem 215.

As shown, the perception nodes 205A-F of the first layer 244 and the perception nodes 212A-E of the second layer do not pass sparse feature vectors to the application subsystem 215, whereas the perception nodes of the third through sixth layers 248-254 do pass sparse feature vectors 256A-D, 258A-C, 260A-B, 262 to the application subsystem 215. However, in alternative embodiments the first and/or second layer perception nodes may generate sparse feature vectors and pass them to the application subsystem 215 and/or perception nodes from one or more of the higher layers may not generate sparse feature vectors or pass such sparse feature vectors to the application subsystem 215.

In the example set forth above, each of the perception nodes passes standard (dense) feature vectors to the next layer of perception nodes and/or to the previous layer of perception nodes. In alternative implementations, perception nodes may pass sparse feature vectors or portions of feature vectors to the perception nodes in the next layer and/or in the previous layer.

In some embodiments, two or more of the perception nodes on a same layer share a common code book (e.g., have the same set of centroids). For example, groups of perception nodes 205A-F may share common code books. Groups may be set based on proximity. Proximity may be based, for example, on Euclidean distance. For example, data items may be two-dimensional (2D) or three-dimensional (3D) images, and these images may be divided into 2D or 3D image patches. Each perception node 205A-F may be responsible for a different image patch. Perception nodes that are responsible for image patches that are near to each other may be grouped together and share a common code book. Another example for audio data may divide an input audio data item into different frequency ranges, and each perception node 205A-F may be responsible for a particular frequency range. A shared code book may be used for perception nodes 205A-F that handle similar or nearby frequency ranges.

Application node 230 of application subsystem 215 includes a mapping component 235 that maps the multiple sparse feature vectors 256A-D, 258A-C, 260A-B, 262 into an output space to determine an output 245. Application node 230 and mapping component 235 may function as described with reference to the similarly named application node 130 and mapping component 135 of FIG. 1. In some embodiments (not shown), application subsystem 215 includes multiple application nodes 230, which may be arranged in a single layer or may be arranged hierarchically. Error calculator 240 may generate an error 242 based on a function of a target associated with data item 211 and output 245, and may provide the error to the application subsystem 215 and perception subsystem 210. In one embodiment, error calculator component 240 broadcasts the error 242 to each of the perception nodes 205A-F, 212A-E, 218A-D, 220A-C, 225A-B, 228, and each perception node may determine whether it should be updated based at least in part on the error 242.

In embodiments, each perception node 205A-228 receives the error 242 or relevancy rating and makes a decision whether to update centroids within the perception node or to allocate new centroids within the perception node based on the received error 242 or relevancy rating and a novelty rating determined by that perception node 205A-228. For example, a generated error 242 may be high, which may indicate a high relevancy. However, perception nodes of lower level layers (e.g., of first layer 244 and/or second layer 246) may determine that their received inputs associated with the error 242 or relevancy rating have a low novelty rating. For example, the low level layers may have already learned a complete set of types of low level patterns that are material. However, perception nodes at higher layers (e.g., the third layer 248, fourth layer 250, fifth layer 252 and/or sixth layer 254) may determine that their inputs associated with the error or 242 or relevancy rating have a high novelty rating. Accordingly, one or more of the higher layer perception nodes may surgically learn new things by allocating new centroids. This learning approach enables the machine learning system 202 to learn much faster than traditional machine learning systems (e.g., neural networks and deep networks) and with better sample efficiency. Additionally, this learning approach enables the machine learning system 202 to learn continually in a non-stationary setting.

In further embodiments, processing at the different layers may be parallelized and pipelined. Each layer depends on the representations (e.g., feature vectors) from the previous layer. However, each perception node may function autonomously and in parallel based on its inputs. For example, each node makes local decisions regarding whether to allocate centroids, how to create representations (feature vectors), the propagation of sparse feature vectors, and so on. While the nodes at one layer are processing their inputs based on a data item received at a time t, the nodes at the next layer may be processing their time inputs that are associated with a data item received at time t−1. Similarly, the nodes at the next higher layer may be processing their inputs that are associated with a data item that was received at time t−2. This enables the nodes at different layers and even different nodes within the same layer to execute on different processing devices and/or on different computing devices. Distributing execution of the various perception nodes across multiple processing devices and/or or computing devices may facilitate faster implementation of the machine learning system.

Figure 2B:
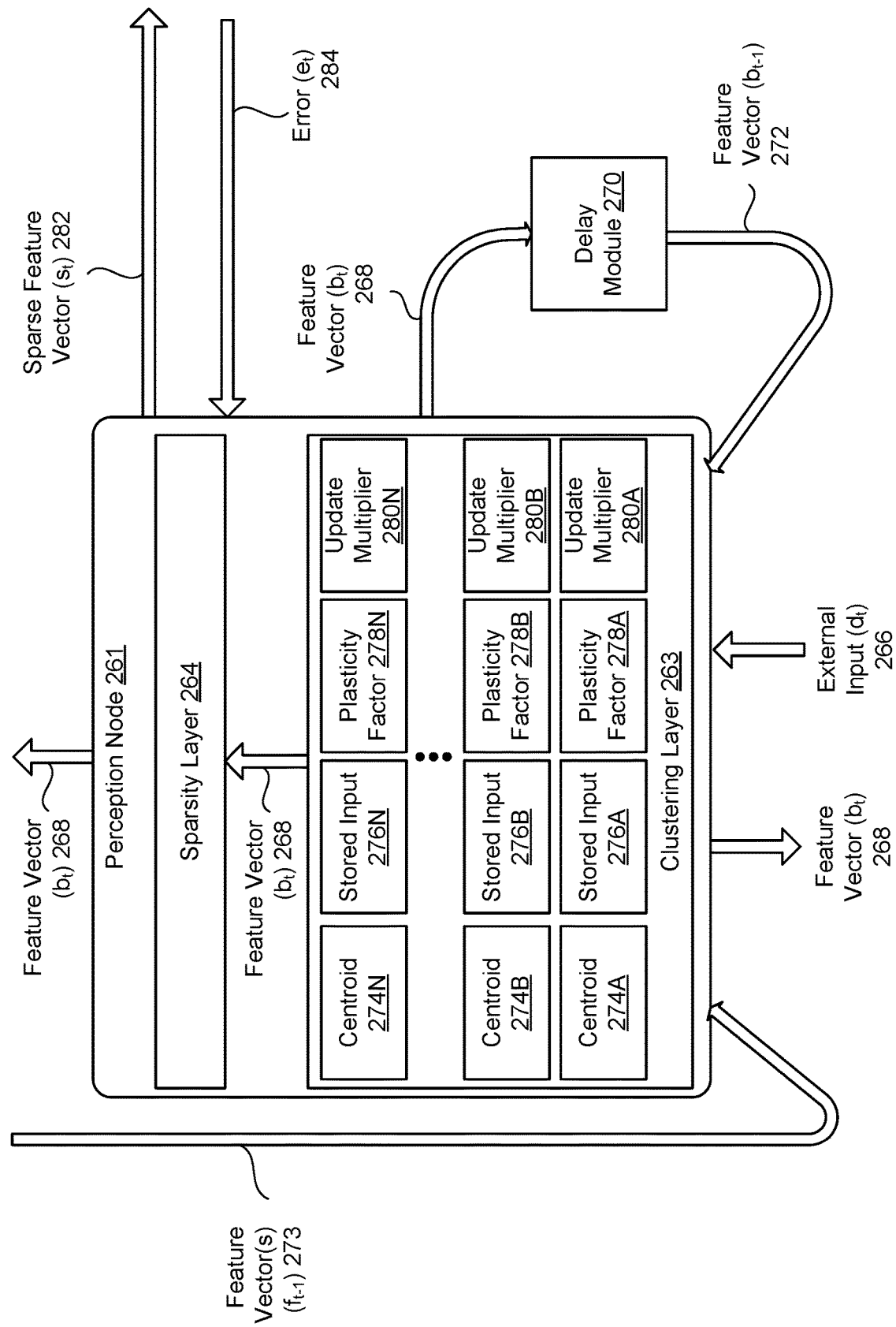
FIG. 2B is a block diagram illustrating a perception node of the machine learning system of FIG. 2A, in accordance with embodiments of the present disclosure.

FIG. 2B is a block diagram illustrating a perception node 261 of the machine learning system of FIG. 1 and/or FIG. 2A, in accordance with embodiments of the present disclosure. The perception node 261 may correspond to any of the perception nodes 205A-F, 212A-E, 218A-D, 220A-C, 225A-B, 228 of the perception subsystem 210 and/or to any of the first layer perception nodes 114, second layer perception nodes 116 and/or third layer perception nodes 118 of FIG. 1. In one embodiment, each perception node 205A-F, 212A-E, 218A-D, 220A-C, 225A-B, 228 has the structure and/or properties set forth in perception node 261. Accordingly, in embodiments each perception node at each layer of the perception subsystem may include its own recurrent structure (e.g., may make decisions based on current external input as well as a previous feature vector generated by that perception node). Accordingly, each perception node may separately capture spatial regularities, temporal regularities and spatio-temporal regularities that are at that node's layer. In contrast, for convolutional neural networks and deep networks (even those that consider a time varying signal) the inputs at most of the layers are static, and do not take into account temporal or spatio-temporal regularities. Convolutional neural networks and deep networks may include an RNN (e.g. long short-term memory (LSTM)) at a top layer of the convolutional neural network or deep network, but that is the only layer of the convolutional neural network or deep network that has memory. Accordingly, important temporal and spatio-temporal data may be lost in convolutional neural networks and deep networks.

Perception node 261 includes a clustering layer 263 and a sparsity layer 264. The clustering layer 263 includes a collection of centroids 274A-N, where each centroid is associated with a particular pattern or data point in a multi-dimensional space. Each centroid may be associated with a stored input 276A-N, a plasticity factor 278A-N and/or an update multiplier 280A-N. The stored input 276A-N may be a stored external input that is stored for a particular centroid when that centroid is closest to that external input. Each centroid 274A-N may additionally be associated with its own plasticity factor 278A-N. The plasticity factor 278A-N represents how much a centroid is permitted to change. The plasticity factor 278A-N may decrease over time such that eventually a given mature centroid that has been updated numerous times in the past retains a fixed value. Each centroid 274A-N may additionally be associated with its own update multiplier 280A-N. The update multiplier 280A-N may represent how much to modify a centroid based on how material that centroid was to a current output. Plasticity factors 278A-N, stored input 276A-N and update multipliers 280A-N are discussed in greater detail below.

At a time t, the perception node 261 may receive an external input $d_t$ 266. The external input $d_t$ 266 may be a portion of a data item received by machine learning system 202 or may be one or more feature vectors generated by other perception nodes at a lower layer than the perception node 261. At the time t, the perception node 261 may also receive a feature vector $b_{t-1}$ 272 previously generated by the perception node 261 based at least in part on a previous external input received at the time t−1. The perception node 261 may additionally or alternatively receive one or more feature vectors $f_{t-1}$ 273 from one or more perception nodes at a next layer in the hierarchy of perception nodes. The received feature vectors $f_{t-1}$ 273 may be standard (dense) feature vectors, sparse feature vectors, or portions of feature vectors. For example, the received feature vectors $f_{t-1}$ 273 may include feature elements having feature element values that exceed a threshold, or may have a threshold number of feature elements with non-zero feature element values.

In some embodiments, a previously combined input, sequence of combined inputs, or function of one or more combined inputs was stored at the perception node 261. The newly received combined input may be added to the previous combined input, sequence of combined inputs, and so on. A function of the new combined input and/or the one or more prior combined inputs may be computed. The function may be compared to some criteria to determine whether to process the new input (e.g., whether to advance a clock cycle for the perception node 261 or a layer of the perception subsystem associated with the perception node 261). In one embodiment, the received input is compared to a previous input, and a difference measure or similarity measure is determined based on a result of the comparison. If the distance is below a distance threshold (or the similarity is above a similarity threshold), then the current input is very similar to the previous input or inputs, and may not generate a different result. Accordingly, it may not be worthwhile to process the current input. In one embodiment, a moving average of distances between current input and previous input is maintained. If the moving average is below the distance threshold, then the most recent input may not be processed. For example, each perception node may look for cumulative changes in its sequence of inputs. When there are enough cumulative changes detected by a perception node 261, then that perception node 261 may advance its clock and process the new input. Some function of changes across multiple time steps may trigger advancement of the clock for a perception node or layer.

The clustering layer 263 may combine the external input 266 with the feature vector 272 and/or the feature vectors 273, and may compare the combined input to centroids 274A-N. For each centroid 274A-N, clustering layer 263 may determine a distance between that centroid and the combined input. Clustering layer 263 may then generate a feature vector $b_t$ 268 as a result of the comparing. The feature vector $b_t$ 268 may include a plurality of feature elements, where each feature element is associated with a particular centroid 274A-N and has a feature element value that represents a distance to that centroid 271A-N. The perception node 261 may then provide the feature vector $b_t$ 268 to one or more perception nodes at a next layer in the hierarchy of nodes. Additionally, the perception node 261 may provide the feature vector $b_t$ 268 to one or more perception nodes at a lower layer in the hierarchy of nodes. Alternatively, the perception node 261 may pass some function of the feature vector 268 or some portion of the feature vector 268 to one or more perception nodes at lower layers in the hierarchy of nodes.

The clustering layer 263 may determine a feature element having a highest feature element value, and may store the combined input as the stored input 276A-N for the centroid associated with the feature element having the highest feature element value (the winning centroid). The clustering layer 263 may additionally pass the feature vector 268 to a delay module 270 and/or to a sparsity layer 264. The delay module 270 may retain the feature vector 268 for passing back into the perception node 261 at a time t+1. The sparsity layer 264 may optionally generate a sparse feature vector $s_t$ 282 from the feature vector $b_t$ 268. The sparse feature vector $s_t$ 282 may replace one or more feature element values (e.g., for all feature elements other than the feature element having the highest feature element value) in the feature vector $b_t$ 268 with zero values. The perception node 261 may then pass the sparse feature vector $s_t$ 282 to the application subsystem 215. In some embodiments, the sparse feature vector $s_t$ 282 is passed to the one or more perception nodes at the lower layer rather than the feature vector $b_t$ 268.

The perception node 261 may receive an error $e_t$ 284, a relevancy rating based on the error that is a function of the error, or some other relevancy rating from the error calculator 240. The perception node 261 may then determine a novelty rating for the feature vector $b_t$ 268, and may determine whether update criteria are satisfied based on the received relevancy rating and the determined novelty rating. Update criteria are discussed in greater detail below. If first update criteria are satisfied, then each centroid 274A-N may attempt to perform an update based on the received error 284 (or relevancy rating), the stored input 276A-N associated with that centroid, the plasticity factor 278A-N associated with that centroid, the update multiplier 280A-N associated with that centroid and/or other variables. If second update criteria are satisfied, then one or more of the centroids 274A-N may attempt to allocate a new centroid based on the associated stored input 276A-N.

One objective achieved in some embodiments of this disclosure is to facilitate a system which offers incremental, or lifelong, learning. Such lifelong learning may be achieved to recognize static spatial patterns (e.g., in input data that does not have a time dependency), temporal patterns, and/or spatio-temporal patterns (e.g., for input data that exhibits both spatial dependencies as well as temporal dependencies). In one embodiment, we define lifelong learning as the ability of a system to acquire new representations and mappings of said representations to desired outputs, in an online and gradual manner, without the requirement of having all training information be made available at any one time. Moreover, a change in the statistics of the input data should be detected by the system without the need for external indication of said change. In non-stationary learning settings, whereby the inputs presented to the system are characterized by statistics that change over time, a key challenge is mitigating forgetting of old representations learned as new ones get acquired. This is something that primates, including humans, exhibit as a core skill and has thus far posed a formidable challenge when attempting to achieve at scale using computing machines.

In most supervised learning frameworks, a neural network can be viewed as a large parametric model, where the parameters of the network are its weights. Training said networks involves an iterative process of repeatedly presenting input/target pairs, and adjusting the weights of the network with each such presentation so as to minimize the error associated with the network outputs. However, a key assumption in supervised learning is that the training regime is stationary, which basically means that the statistics of the training set are fixed and do not change over time. While that's a reasonable assumption to make in many settings in which a large training corpus has been collected, embodiments of the present disclosure pertain to many real-world scenarios in which not all training data is available a priori and thus the system learns progressively.

The philosophical approach conveyed in embodiments of the present disclosure comprises of three main assertions. The first is that in order to support lifelong learning, nodes of the perception subsystem dynamically allocate representational resources (e.g., centroids) in a data-driven manner and upon need. This means that one condition for allocating new representational resources is detection of novelty in the patterns observed, relative to previously observed patterns. However, all practical systems are resource-limited and, consequently, novelty alone may be an inefficient condition for resource allocation. The complementing condition triggering resource allocation is an indication from the application node 130, 230 that resource allocations are merited (referred to herein as relevancy). In one embodiment, when the application node 130, 230 indicates that its current mapping (transformation) of the feature elements produced by the perception node(s) yield relatively high error, this high error condition forms an indication signal to the perception node that it should consider allocating additional representational resources so as to improve the performance of the system as a whole (given that the output of the application node 130, 230 is the system's output).

The third assertion guiding embodiments described herein is that the encoding of representations from the perception nodes to the application node 130, 230 are sparse (e.g., are sparse feature vectors). A sparse feature vector is a feature vector in which the values for most feature elements are zero. In one embodiment, all feature element values except for one feature element value are zero in a sparse feature vector. Specifically, at any given time, only one of the feature elements is nonzero in some embodiments. An underlying principle behind the sparse encoding is to enforce different regions of the sensory input space to correspond to different feature elements in the representations passed to the application node 130, 230. If that is guaranteed, by gradually increasing the number of possible feature elements (e.g. centroids) that can appear in the representations passed to the application, a controlled and progressive characterization of the input space takes place, which results in continual learning of representations while mitigating forgetting of prior representations.

As an example illustrating this principle, let us assume that the perception node 261 receives as input various patterns corresponding to the letters "A" and "B". Let us assume that when presented with patterns corresponding to the letter "A", feature elements 1, 2 and 3 get activated (i.e. take on nonzero values). Let us further assume that when presented with patterns corresponding to the letter "B", feature elements 4, 5 and 6 get activated. Correspondingly, the application node 230, which may be trained as a classifier charged with distinguishing between "A" and "B" patterns, learns to map feature vectors with elements 1, 2 and 3 active to class "A" output, and feature vectors with elements 4, 5 and 6 active to class "B" output. Next, let us assume that the perception node 261 is provided with patterns of the letter "C", which it had not received as input prior to that point. The guiding principles followed by some embodiments of this disclosure would facilitate the allocation of novel feature elements, say 7, 8 and 9, when presented with patterns corresponding to the letter "C". This, in turn, will mean that the classifier (e.g., application subsystem 115, 215) would learn the mapping of feature elements 7, 8 and 9 to class "C". However, in doing so, it will fully retain the mapping of feature elements 1 through 6 to classes "A" and "B", as indicated above, since feature elements with value of zero do not incur changes to weights that they correspond to. In other words, by utilizing sparsity and relying on different underlying patterns yielding mutually exclusive (or strongly non-overlapping) set of active feature elements, the system as a whole mitigates forgetting effects that would otherwise take place, as they do in conventional supervised learning settings.

The perception node(s) 261 is charged with receiving sensory inputs (e.g., external input 266), that may originate from multiple modalities, creating long-term memory that captures regularities in said inputs and exporting to the application node 130, 230 sparse feature vector(s) 282 extracted from the memory it generates, which facilitates mapping by the application node 130, 230 to a desired output space (e.g., to produce an output 145, 245). Learning at the perception node(s) 261 may occur in a mostly unsupervised (i.e. weakly-supervised) manner such that the machine learning system 105, 202 can continue to learn about the underlying structure of observations even for inputs (e.g., data items 112, 211) that do not have corresponding targets or labels. Such semi-supervised learning can be important in many real-world applications, whereby labeled examples are either hard to obtain or costly to collect.

The process governing the learning in the perception node(s) 261 in one embodiment is an online dynamic clustering algorithm, in which a set of centroids, represented as points in the input space, are maintained providing compact (possibly lossy) representation of the sensory inputs observed. Clustering is inherently an unsupervised learning process in that it aims to capture dense regions of samples observed. Embodiments expand on that basic notion to facilitate a semi-supervised learning framework that attempts to both capture regularities in the observations as well as adhere to the demands of the application node 130, 230, which it ultimately serves.

The online aspect of the learning suggests that the allocation of and adjustments made to said centroids are conducted in an incremental manner, with each new input received, and may not require extensive storing of past inputs and processing of any past inputs. In other words, with each input, the online clustering process determines whether any updates to the centroids values should be made.

The dynamic aspect of the clustering process refers to the incremental growing of the centroids set, which may begin with a single centroid and grow to an arbitrary size, in accordance with the nature of the input data that is being processed. The framework additionally allows for pruning (or removal) of centroids, assuming such pruning is deemed necessary or beneficial.

At an initialization stage, a single centroid (or an initial set of centroids) is established in the perception node(s) 261. The mean (location) of this first centroid can be arbitrarily set or set according to the first input received by the node. Subsequent new inputs may be observed, and under the right conditions said inputs will impact one or more of the allocated centroids. In one embodiment, a winner-take-all framework is used for updating centroids and/or for generation of a sparse feature vector 282, in which for every incoming input there is at most one centroid that is the "winning centroid" and is thus selected for inference and potential updating.

As set forth above, in embodiments perception node 261 includes a clustering layer 263 and a sparsity layer 264. Alternatively, the sparsity layer 264 may be omitted in some embodiments. The combined input (e.g., including external input 266, feature vector 272 and feature vector(s) 273) may be viewed as a point in a multi-dimensional space. In embodiments, the clustering layer 263 applies the aforementioned clustering process (e.g., the online dynamic clustering process) to determine values for each feature element or resource based on a distance measure between a) a centroid associated with the feature element or resource and b) the combined input. The clustering layer 263 may generate a feature vector that includes feature element values for each of the feature elements and provide the feature vector 268 to the sparsity layer 264. The sparsity layer 264 may then generate the sparse feature vector 282 from the feature vector 268 by selecting one or more feature elements having highest values and then replacing the values of all unselected feature elements with zeros. In one embodiment, a winner-takes-all approach is used, in which only the feature element with the highest value is selected. In another embodiment, n feature elements having highest values are selected, where n is an integer value greater than 1.

Figure 3:
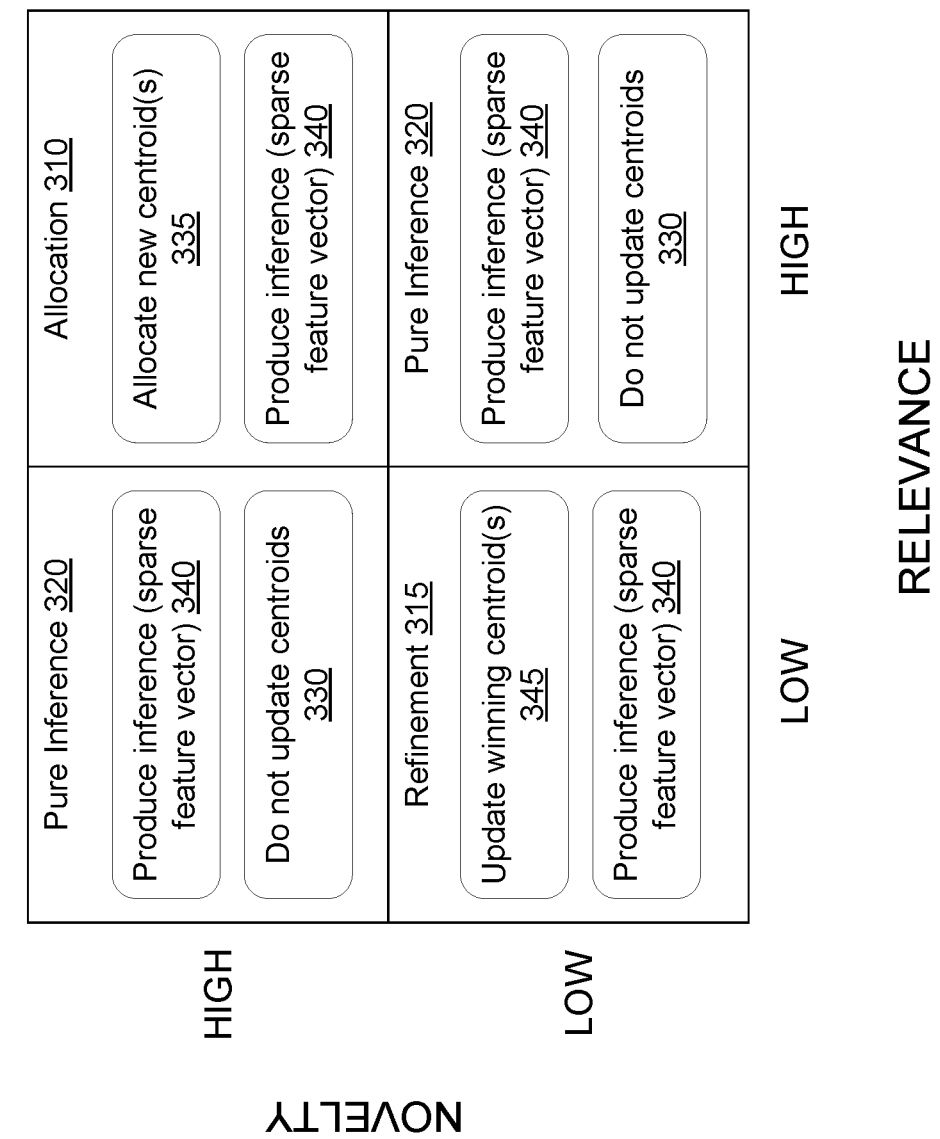
FIG. 3 is a block diagram illustrating a node update paradigm for a machine learning architecture, in accordance with embodiments of the present disclosure.

In one embodiment, a goal of the perception node(s) 261 is to process each incoming input by associating it with one (or more) of the centroids 274A-N. Such association can lead to one or more centroids being updated as well as directly impact the content of the representation (e.g., sparse feature vector(s) 282 forwarded to the application node 230. Growing the number of centroids in the perception node(s) 261 is defined by a combination of two considerations. The first is the degree of novelty that the current input and/or recent past inputs exhibits and the second is the potential relevancy a newly allocated centroid (or centroids) would have on the accuracy of the application node 130, 230, as reflected by the error signals or other relevancy signals or scores it produces and has produced in the recent past. In other words, in one embodiment two events take place in order for a new centroid to be allocated in a perception node 261: the first is that the current input pattern and/or recent past input patterns are dissimilar enough to the existing set of centroids and the second is that a relevancy measure (e.g., a relevancy rating), which may be derived from one or a sequence of errors and/or confidence values broadcasted by the application node 130, 230, is sufficiently high. In another embodiment, the relevancy measure may be used to define a relevancy-weighted metric of novelty. In view of this framework, three disjoint operating regimes can be defined, as shown in FIG. 3.

One possible way to define novelty is to measure the similarity between a given input and each of the existing (previously allocated) centroids in a perception node and determine whether said similarity is sufficiently low (indicating high novelty of the pattern). Potential similarity measures are the cosine similarity and the inverse Euclidean distance, however any distance or similarity measure may be used. In one embodiment, the distances or similarities are compared to one or more similarity threshold (or distance threshold) to determine whether the new input has sufficiently high or low novelty to satisfy one or more novelty criteria. The threshold (or thresholds) may be an adaptive threshold or a fixed threshold. For adaptive thresholds, the threshold may be determined dynamically based on one or more input parameters. In one embodiment, the threshold for novelty can be determined as the mean distance to the centroid+N standard deviations of the distance, wherein N is an integer value of 1 or greater. The mean and standard deviation can be approximated using moving average estimates, which adapt over time as data comes in.

One possible way to define relevancy is to measure the error associated with the output 145, 245 to determine a relevancy rating. An error calculator 140, 240 may perform an error calculation to produce an error 142, 242, and the error may be provided to the perception node(s) 261 and/or to the application node 130, 230 as a relevancy rating. In one embodiment, the error is linearly or non-linearly proportional to relevancy. Accordingly, a high error means a high relevancy and a low error means a low relevancy. In one embodiment, the error is the relevancy rating.

Each of the perception node(s) 261 and application node 130, 230 may then perform distinct updates based on the error. The provided error 142, 242 may be a simple error based on a difference between output 145, 245 and a target associated with an input data item 112, 211. Alternatively, the error 142, 242 may be an accumulated error that takes into account a current error as well as errors associated with previous inputs (e.g., data items 112, 211 and/or previously generated feature vectors). Accordingly, the level of relevancy (relevancy rating) may be determined by accumulating instantaneous application error values. For example, we can define an accumulated error measure B, and define it as B=B+|err(t)|, where |err(t)| is the absolute value of the current error for an input data item at time t. Error calculator 140, 240 can check to see if this accumulated error has crossed some threshold to determine whether relevancy is high or low. This is a way to base the decision on relevancy not necessarily on instantaneous errors but rather on sufficient accumulation of errors. In one embodiment, a leaky bucket model is used that accumulates errors associated with multiple inputs, but progressively reduces the accumulated error using a reduction factor. For example, we can define the error measure as B=max[0, B×alpha+|err(t)|], where alpha is a constant between 0 and 1, which would accumulate error but also continuously decrease the accumulated error, which means that now the errors that accumulate should arrive within a certain period of time. This is often referred to as a leaky-bucket integrator. One example leaky bucket integrator variation for determining a relevancy rating defines a relative accumulated application error at time n, A(n), as:

$$A(n)=\max\{0, e_{app}(n)-e'_{app}(n)\}$$

where e'(n) denotes a moving average estimate of the mean of the application error at time n.

This particular formulation of accumulated error takes on high values when a sequence of instantaneous application error values are observed while the prior mean application error was relatively low.

In some embodiments, multiple different error thresholds are used to determine whether novelty criteria are satisfied. For example, novelty criteria may include an upper error threshold and a lower error threshold. Under some circumstances the novelty criteria may be satisfied when the error exceeds the upper error threshold. Under other circumstances, the novelty criteria may be satisfied when the error exceeds the lower error threshold but does not necessarily exceed the upper error threshold. This may mitigate or prevent excessive new centroid allocation.

Figure 6:
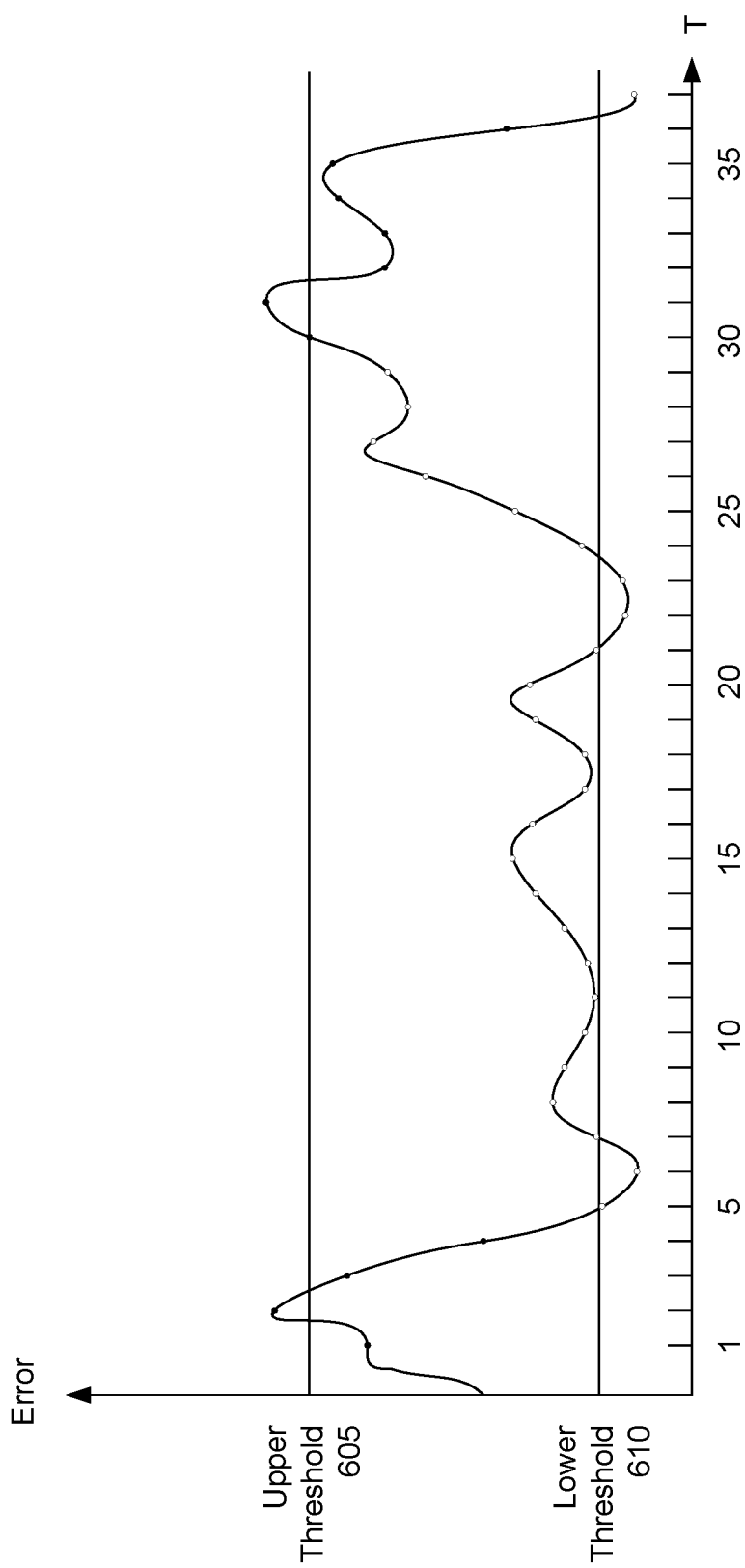
FIG. 6 is a graph illustrating centroid allocation for a node of a machine learning architecture, in accordance with embodiments of the present disclosure.

Referring to FIG. 6, a graph illustrating centroid allocation for a node of a machine learning system is shown, in accordance with embodiments of the present disclosure. Relevancy criteria may include an upper error threshold 605 and a lower error threshold 610. One or more of the perception nodes, the error calculator 140, 240, or another module may keep track of when a determined error is below the lower error threshold 610 (referred to as a first condition) as well as when the determined error exceeds the upper error threshold 605 (referred to as a second condition). When a new error is determined, a perception node, the error calculator 140, 240 or another module may determine whether the first condition occurred more recently or the second condition occurred more recently. If the first condition occurred more recently, then the error may satisfy relevancy criteria for allocation of a new centroid if the error is above the upper error threshold 605. If the second condition occurred more recently, then the error may satisfy relevancy criteria for allocation of a new centroid if the error is above the lower error threshold 610 (whether or not the error is above the upper error threshold 605). As shown, at time t1 a calculated error (which may be an instant error, an accumulated error, or some other error value) is below the upper threshold 605 but above the lower threshold 610. Accordingly, a new centroid may be allocated at time t1. Alternatively, a centroid may not be allocated at time t1 since the upper threshold 605 has not yet been exceeded. In either case, at time t2 a new centroid is allocated since the error exceeds the upper threshold 605. Two more new centroids may also be allocated at times t3 and t4. At time t5 the error is below the lower error threshold. Accordingly, no centroid is allocated at time t5. No new centroid is allocated at time t6 either since the error is again below the lower threshold 610. At time t7 the error is above the lower threshold 610. However, since the first condition (error lower than the lower threshold 610) occurred more recently than the second condition (error higher than the upper threshold 605), no centroid is allocated. Similarly, no centroids are allocated at times t8 through t29. At times t30 and t31 the error exceeds the upper threshold 605, which causes new centroids to be allocated. At time t32 the error is below the upper threshold 605 but above the lower threshold 610. Since the second condition occurred more recently than the first condition, a new centroid is allocated at time t32. Similarly, new centroids are also allocated at times t33 to t36. At time t37 no centroid is allocated.

Another possible way to define relevancy is based on confidence. Referring back to FIGS. 1-2B, in some embodiments, application node 130, 230 generates a confidence value in addition to output 145, 245 or as a part of the output 145, 245. The confidence may indicate an estimate as to a likelihood that the output 145, 245 is a correct output. An output 145, 245 that has low confidence may suggest that the error would be high. The confidence may therefore be used to generate a relevancy rating for the output 145, 245. A confidence may be determined whether or not an input data item 112, 211 is associated with a target. Accordingly, in cases where a target is not provided, the confidence estimate can be used as a relevancy rating. In one embodiment, confidence is approximately inversely proportional to relevancy. Accordingly, a high confidence may indicate a low relevancy while a low confidence may indicate a high relevancy.

The provided confidence (or novelty rating based on confidence) may be a simple confidence determined for a current data item 112, 211. Alternatively, the confidence may be an accumulated confidence measure that takes into account a current confidence value as well as confidence values associated with previous data items 112, 211. In one embodiment, a leaky bucket model is used that accumulates confidences associated with multiple data items, but progressively reduces the accumulated confidence value using a reduction factor.

In one embodiment, the distances or similarities computed for centroids of a given perception node 261 are compared to one or more similarity threshold (or distance threshold) to determine whether the new input has sufficiently high or low novelty to satisfy one or more novelty criteria for the given perception node. The threshold (or thresholds) may be an adaptive threshold or a fixed threshold. For adaptive thresholds, the threshold may be determined dynamically based on one or more input parameters. In one embodiment, the threshold for novelty can be determined as the mean distance to the centroid+N standard deviations of the distance, wherein N is an integer value of 1 or greater. The mean and standard deviation can be approximated using moving average estimates, which adapt over time as data comes in.

In one embodiment, a first similarity threshold is used to determine whether the new input has high or low novelty, and a second similarity threshold is used to determine whether a generated feature vector should be a null feature vector (a feature vector in which all values are zero) rather than a sparse feature vector. If the similarity values for all centroids of a node are below the second similarity threshold, this indicates that the new input is dissimilar from all of the centroids. In such instances, a null feature vector may be generated. The second similarity threshold may have a value, for example, of 0.1, 0.05, 0.01, or some other low value.

FIG. 3 is a block diagram illustrating a node update paradigm 300 for a machine learning system, in accordance with embodiments of the present disclosure. The node update paradigm 300 includes the dual criteria of novelty and relevancy. Each of the novelty criterion (or criteria) and the relevancy criterion (or criteria) may be associated with its own threshold or set of thresholds, which may be static thresholds or dynamic (variable) thresholds. A high novelty may be determined if the novelty rating associated with a data item exceeds a novelty threshold, and a low novelty may be determined if the novelty associated with the data item is below the novelty threshold. Similarly, a high relevancy may be determined if the relevancy rating associated with the data item exceeds a relevancy threshold, while a low relevancy may be determined for the data item if the relevancy rating for that data item is below the relevancy threshold.

Different operations associated with updating a perception node are determined based on a combination of novelty and relevancy, where novelty is determined by a perception node and relevancy is derived from an output of an application node. Each perception node of a perception subsystem may apply the node update paradigm 300 to determine whether that perception node should be updated. In one embodiment, two or more perception nodes in a layer of the hierarchy of nodes share a common code book, where the code book is a set of centroids. For example, nodes that have close spatial proximity (e.g., in terms of their input space) may share a common codebook. In such an embodiment, updates may be made to the shared code book rather than to the individual perception node that uses that code book. Accordingly, updates made by one perception node may be later applied by a second perception node. Additionally, if two nodes use a common code book, then each of those nodes may contribute separate updates to that code book in parallel or in series. Alternatively, perception nodes within a layer of the hierarchy of nodes may not share code books.

The node update paradigm 300 includes a first regime of pure inference 320 (where centroids are not updated), a second regime of refinement 315, and a third regime of allocation 310. Each perception node in the perception subsystem may make its own individual determination as to which of the three regimes of pure inference 320, allocation 310 and refinement 315 applies for a given input and/or output. The term inference as used herein means the passing of a feature vector from a perception node to an application node.

The first regime (pure inference 320) pertains to the case of high novelty and low relevancy. This would suggest that the processed input pattern deviates enough from the existing set of centroids (which have presumably captured dense regions of the input space based on prior inputs received). It would also suggest that the relevancy of this novel pattern is low. As a result, no updating of any of the existing centroids should take place. Accordingly, in the pure inference regime 320, a sparse feature vector (inference) is produced (block 340) and no centroids of a perception node are updated (block 330). In some embodiments, the input (data item plus previous feature vector) is stored in association with the winning centroid.

In one embodiment, a similarity threshold is used to determine whether the sparse feature vector should be a null feature vector. If every value in the sparse feature vector is below the similarity threshold, then the sparse feature vector may be replaced with a null feature vector. In such an instance, the inference produced at block 340 may be a null feature vector.

The second regime is the refinement regime 315 in which low novelty and low relevancy are observed, suggesting that the current input is close enough to one of the centroids and as such should shape that centroid so as to pull it closer to the current input. Accordingly, the winning centroid (centroid that is closest in the multi-dimensional space to the input that includes the current data item and the previous feature vector) is updated for the perception node. Additionally, other centroids that were recently winning centroids (e.g., e.g., centroids that were closest in the multi-dimensional space to previous inputs that included a previous data item and a previous feature vector) may also be updated, as is discussed in greater detail below. Additionally, in one embodiment a sparse feature vector (also referred to as an inference vector) is produced at block 340. The sparse feature vector exported to the application node may contain all zeros other than in the index (feature element) corresponding to the winning centroid, for which the similarity to said winning centroid is injected.

The third regime corresponds to the allocation scenario 310, in which the relevancy is high and the novelty is high as well. This suggests that the current input is novel and given that the application node carries a high error for the current representation corresponding to this input, allocation of a new centroid should be carried out. Accordingly, in one embodiment a new centroid is allocated (block 335), and the mean of the new centroid takes the value of the current input. Additionally, further new centroids may also be allocated based on recent previous inputs, as is discussed in greater detail below. A corresponding sparse feature vector may be produced (block 340), which takes into account a new feature element or index associated with the new centroid as well as the preexisting feature elements. In one embodiment, the sparse feature vector has a value of 1 (or an otherwise maximal value) for the new feature element and values of 0 for the other feature elements.

In embodiments, the ability to allocate new centroids to represent new observations in input data items ensures that representations of new types of data/new observations can be achieved without distorting representations relating to previous observations about other data items.

The pure inference regime 320 also applies when high relevancy is coupled with low novelty results. As mentioned, in the pure inference regime 320 the node essentially passes the inference with the winning centroid using sparse encoding (e.g., by using a sparse feature vector). In this operational regime no updating of the centroids takes place given that the assumption is that the high error stems from an outlier sample, which is essentially noise rather than a signal carrying sample. Such noise need not impact the centroids. Accordingly, the sparse feature vector is produced at block 340 and no centroids are updated (block 330). In some embodiments, the input (data item plus previous feature vector) is stored in association with the winning centroid.

As discussed above, under some operational conditions (e.g., those conditions that trigger the refinement regime 315), the winning centroid of a perception node is to be updated relative to the current input. In the most basic form, updating the centroids can be achieved using the following general formulation:

$$M_i = M_i + \eta(X - M_i)$$

where X denotes the current input as a point in a multi-dimensional space, i is an index for the particular centroid, $M_i$ is a position of the particular centroid in the multi-dimensional space and $\eta$ is a step size. This formulation of the centroid update rule effectively brings the winning centroid slightly closer to the current input. In a more general embodiment, updating the centroid can be done by minimizing some other (non-Euclidean) distance measure.

Updates to the centroid may be modulated by multiple factors, including the error associated with the output (so as to emphasize some samples vs. others). This would result in an update rule of the following form:

$$M_i = M_i + \eta(X - M_i)E(n)$$

where E(n) is a function of the error (also referred to as application error or output error) at time step n.

In some embodiments, the update to the centroid is modulated by an update multiplier (also referred to herein as an update eligibility factor) $u_i$. Each centroid may maintain its own update multiplier. With each time step (each input), a winning centroid may be determined after the feature vector is computed. The feature vector may include a plurality of feature elements, each having a feature element value (e.g., similarity value). The winning centroid may be the centroid that is associated with the feature element having the highest feature element value. The update multiplier associated with the winning centroid may be reset to a predetermined value. The predetermined value may be a maximum update multiplier. In one embodiment, the maximum update multiplier is 1. A decay factor may then be applied to the update multipliers associated with each of the non-winning centroids. In one embodiment, the decay factor is 0.95. Other example decay factors include 0.99, 0.90, 0.85, 0.80, and so on.

In embodiments, the update multiplier $u_i$ for a centroid is updated with each input according to the formula $u_i = u_i \times \text{beta}$, where beta is a constant between 0 and 1. In embodiments, each node may have its own set of centroids, and each centroid may have its own update multiplier. In one embodiment, an update multiplier threshold is used. An update multiplier of a centroid may be compared to the update multiplier threshold (e.g., $10^{-5}$), and if the update multiplier is equal to or less than the update multiplier threshold, then the associated centroid may not be updated.

Referring back to FIG. 2B, the perception node 261 may include one or more memory modules, and each centroid may use the memory module(s) to remember the combined input (e.g., data item and previous feature vector) that last resulted in a feature vector for which that centroid was the winning centroid as stored input 276A-N. In some embodiments, when update criteria are satisfied, every centroid is permitted to perform an update operation. The update operation for a centroid may be based on the current error, the input stored by a centroid, the step size, and/or other parameters. One example update rule that uses the update multiplier has the following form:

$$M_i = M_i + \eta(X - M_i)E(n)u_i$$

where $u_i$ is the current update multiplier for a given centroid i. In some embodiments, an update multiplier threshold is applied. If the update multiplier is below the update multiplier threshold, then no update may be performed on a given centroid.

The above modulations can further be generalized to include any function of the sequence of past errors, such as with an accumulated error measure. For example, E(n) in the above update rules may be substituted with an accumulated error measure B, where B is defined as B=B+E(n). Another variation could be a leaky accumulation, where E(n) in the above update rule may be substituted with an accumulated error measure B, where B is defined as B=B×alpha+E(n), where alpha is a constant between 0 and 1, which would accumulate but leak as well.

In one embodiment, each centroid of a perception node is associated with a plasticity factor. The plasticity factor for a centroid controls how much that centroid is permitted to change based on a given input or set of inputs. In one embodiment, the plasticity factor is initialized with a high value (e.g., a value of 1), and then gradually decays with each update to that centroid. This enables the centroid to be adjusted relatively quickly when the centroid is first allocated, but slowly reduces the ability of that centroid to change. Eventually, a centroid may become essentially fixed, after which the centroid will no longer be updated. This process promotes stabilization of representations pertaining to regularities in the observations.

Three example update rules that employ a plasticity factor have the forms:

$$M_i = M_i + \eta(X - M_i)p_i$$

$$M_i = M_i + \eta(X - M_i)E(n)p_i$$

$$M_i = M_i + \eta(X - M_i)E(n)u_ip_i$$

where $p_i$ is a plasticity factor for the particular centroid, the plasticity factor having a value that is based on a number of times that the particular centroid has been updated and possibly the magnitude of said updates.

In one embodiment, the plasticity factor $p_i$ for a centroid is updated with each update according to the formula $p_i = p_i \times \text{beta}$, where beta is a constant between 0 and 1. In embodiments, each node may have its own set of centroids, and each centroid may have its own plasticity factor. In one embodiment, a plasticity value threshold is used. A plasticity value of a centroid may be compared to the plasticity value threshold (e.g., $10^{-5}$), and if the plasticity value is equal to or less than the plasticity value threshold, then the associated centroid may not be updated any longer.

In some instances, centroids may be allocated which are not later used, or which are only rarely used. For example, new centroids may be allocated as a result of noisy conditions or otherwise transient conditions that did not persist. Such centroids may not be useful. Accordingly, in some embodiments centroids may be removed if one or more centroid removal criteria are satisfied and/or if one or more criteria for retaining centroids (centroid retention criteria) are not satisfied. The ability to remove centroids yields a simpler (in terms of memory and compute footprint) implementation that improves efficiency and reduces use of system resources. Additionally, in some embodiments each node is limited to a finite number of centroids. The ability to remove centroids ensures that the finite number of centroids that are allocated for a node are all useful centroids.

In one embodiment, newly allocated centroids have a probation period during which those centroids will be removed if they fail to satisfy one or more criteria. In one embodiment, should a newly allocated centroid not be selected as the winning centroid more than N times within a period of time T (probation period) following that centroid's allocation for a node, that newly allocated centroid is removed from the node. The values of "N" and "T" define how conservative the system is in removing allocated centroids.

In one embodiment, a centroid retention criterion is based on the plasticity factor associated with that centroid. As discussed above, in some embodiments centroids are associated with plasticity factors, which are reduced after each update. If the plasticity factor associated with a centroid is above a threshold value after the probation period is ended, then that centroid fails to satisfy the centroid retention criterion and is removed from the node.

Figure 4A:
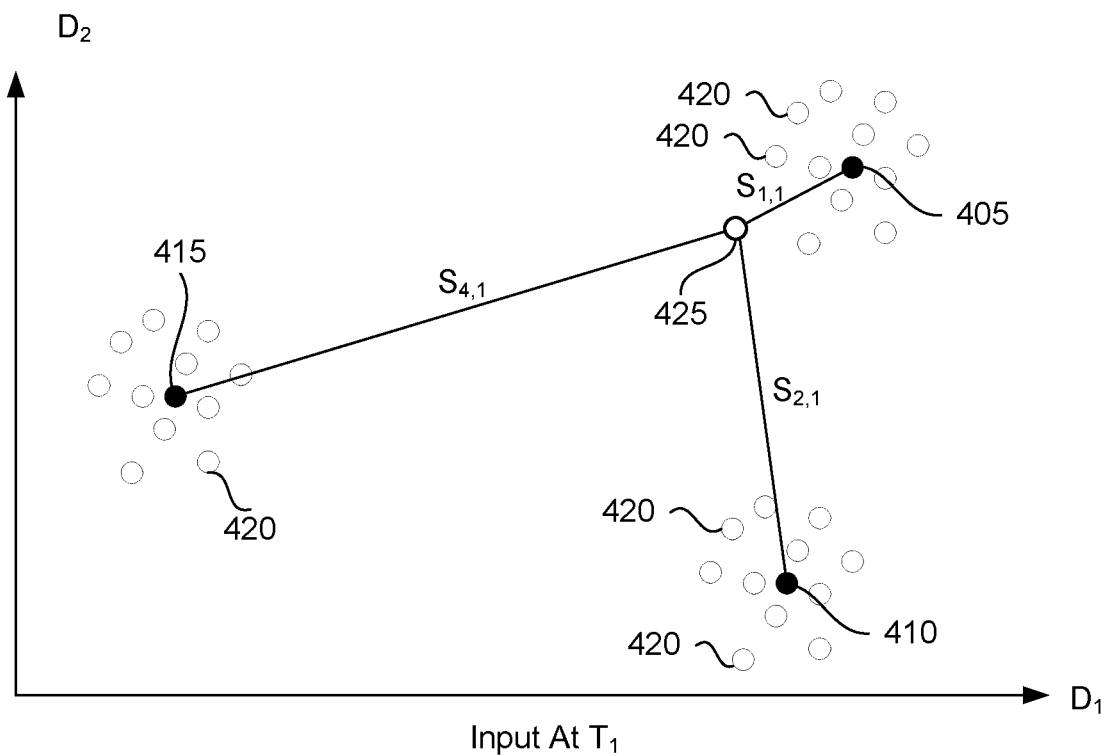
FIGS. 4A-B are graphs illustrating a centroid update process for multiple nodes, in accordance with embodiments of the present disclosure.
Figure 4B:
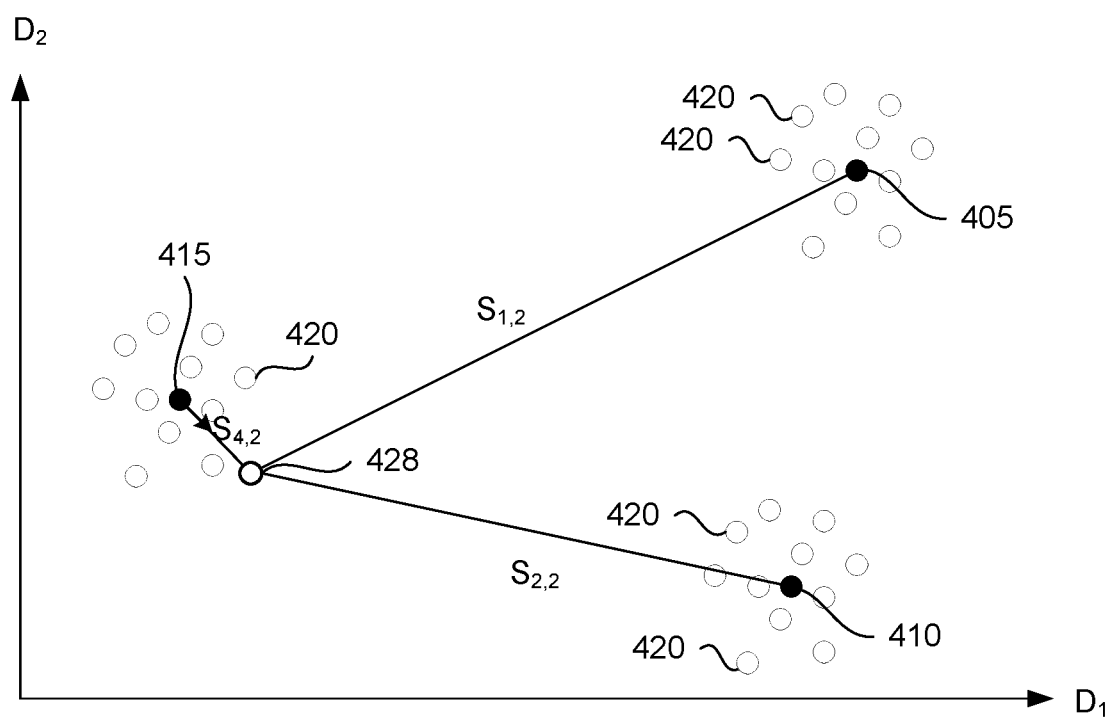

FIGS. 4A-B are graphs illustrating a centroid update process for multiple centroids in a perception node, in accordance with embodiments of the present disclosure. The centroid update process of FIGS. 4A-B is shown for a degenerate two-dimensional (2D) space including dimension 1 ($D_1$) and dimension 2 ($D_2$). However, in most instances the multi-dimensional space will contain many more dimensions (e.g., tens of dimensions, hundreds of dimensions, thousands of dimensions, etc.). As shown, an example perception node contains three centroids 405, 410 and 415. For illustration, multiple different past data items (represented as points in a 2D space) 420 that have affected the positions of the centroids 405, 410, 415 are also shown.

With relation to FIG. 4A, a new data point 425 (e.g., a new input based on a current data item received at time $t_1$ and a previously generated feature vector generated at time $t_0$) is input into the perception node at a time $t_1$, and similarity values are computed for each of the centroids 405, 410, 415. The resulting similarity values are $S_{1,1}$ for the similarity to a first centroid 405, $S_{2,1}$ for a similarity to a second centroid 410 and $S_{3,1}$ for a similarity to a third centroid. The similarity $S_{1,1}$ is greatest between the data point 425 and the first centroid 405. However, either the similarity $S_{1,1}$ does not satisfy a low novelty criterion (e.g., the similarity is below a similarity threshold or conversely a distance is above a distance threshold) or a relevancy rating does not satisfy a relevancy criterion for updating centroids. Accordingly, the data point 425 is stored with relation to the winning first centroid 405 at time $t_1$.

With relation to FIG. 4B, another new data point 428 (e.g., a new input based on a current data item received at time $t_2$ and a previously generated feature vector generated at time $t_1$) is input into the perception node at a time $t_2$, and similarity values are computed for each of the centroids 405, 410, 415. The resulting similarity values are $S_{1,2}$ for the similarity to a first centroid 405, $S_{2,2}$ for a similarity to a second centroid 410 and $S_{3,2}$ for a similarity to a third centroid. The similarity $S_{3,2}$ is greatest between the data point 425 and the third centroid 415. Additionally, the similarity $S_{3,2}$ satisfies a low novelty criterion (e.g., the similarity is above a similarity threshold or conversely a distance is below a distance threshold) and a determined relevancy rating satisfies a low relevancy criterion. Accordingly, the third centroid 415 is updated by moving the third 415 centroid in the direction of the data point 428. This may be performed by computing a vector between the third centroid 415 and the data point 428, and then moving the third centroid 415 along the vector. In one embodiment, the third centroid 415 is adjusted according to one of the update rules set forth above.

Additionally, the first centroid 405 may be updated based on the previous input that was stored for the first centroid 405 when the first centroid was the winning centroid (as set forth with reference to FIG. 4A). The first centroid 405 may be updated by moving the first 405 centroid in the direction of the data point 425. This may be performed by computing a vector between the first centroid 405 and the data point 425, and then moving the first centroid 405 along the vector. In one embodiment, the third centroid 415 is adjusted according to one of the update rules set forth above. For example, the magnitude of the update to the first centroid 405 may be modulated based on an update multiplier in some embodiments.

By updating a current winning centroid as well as one or more other centroids based on previous inputs that were received that resulted in those centroids being the winning centroids, a trace of updates may be made.

Figure 4C:
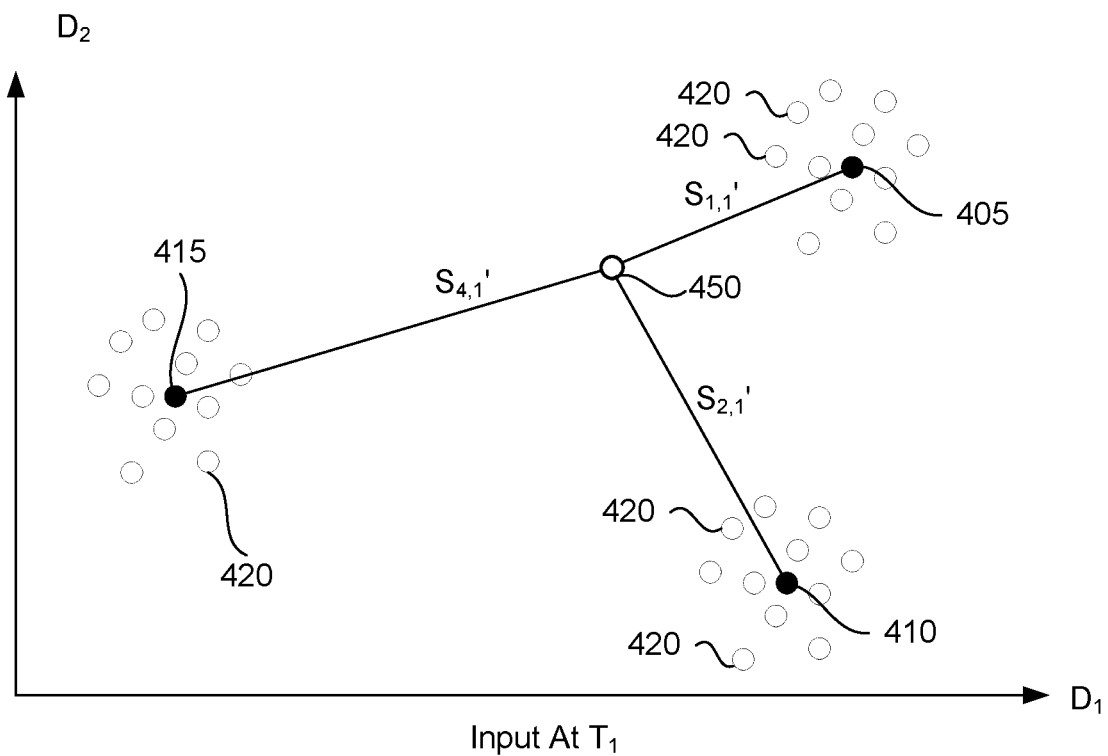
FIGS. 4C-D are graphs illustrating a process to add new centroids to a node, in accordance with embodiments of the present disclosure.
Figure 4D:
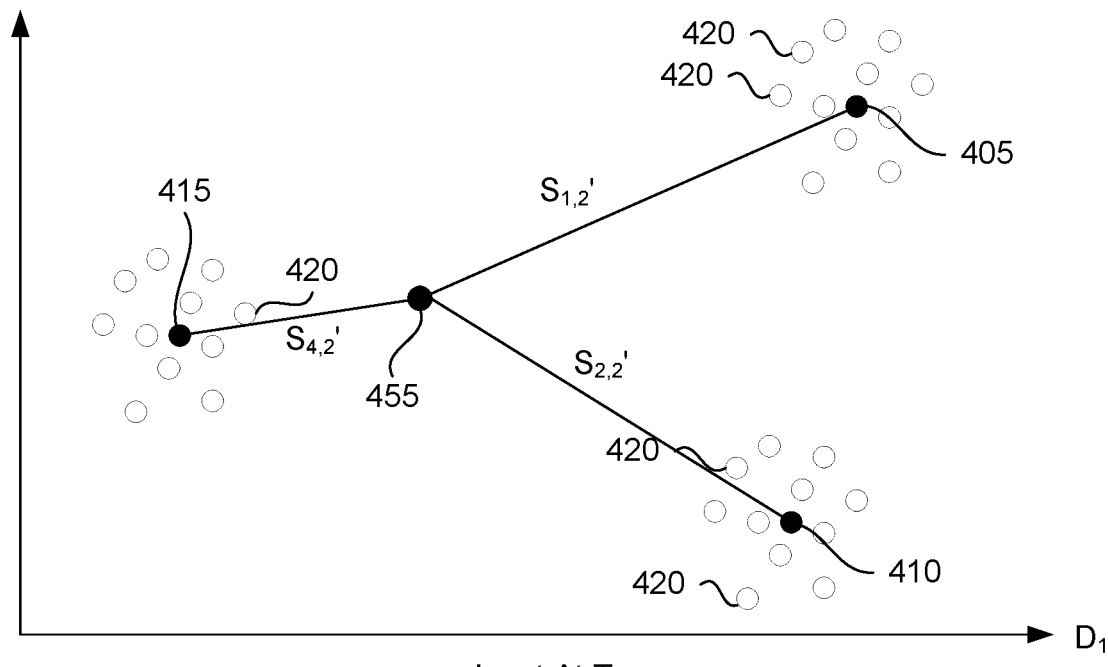

FIGS. 4C-D are graphs illustrating a process to add new centroids to a node, in accordance with embodiments of the present disclosure. The centroid allocation process of FIGS. 4C-D is shown for a simplified two-dimensional (2D) space including dimension 1 ($D_1$) and dimension 2 ($D_2$). However, in most instances the multi-dimensional space will contain many more dimensions. As shown, an example perception node contains three centroids 405, 410 and 415. For illustration, multiple different past data items (represented as points in a 2D space) 420 that have affected the positions of the centroids 405, 410, 415 are also shown.

With relation to FIG. 4C, a new data point 450 is input into the perception node at a time $t_1$, and similarity values are computed for each of the centroids 405, 410, 415. The resulting similarity values are $S_{1,1}'$ for the similarity to a first centroid 405, $S_{2,1}'$ for a similarity to a second centroid 410 and $S_{3,1}'$ for a similarity to a third centroid 415. Each of the similarity values is below a similarity threshold, which causes a novelty rating associated with the data point 450 to satisfy a high novelty criterion. However, a relevancy rating may not satisfy update criteria for allocation of a new centroid. Accordingly, the data point 450 is stored with relation to the winning first centroid 405 at time $t_1$.

With relation to FIG. 4D, a new data point 455 is input into the perception node at a time $t_2$, and similarity values are computed for each of the centroids 405, 410, 415. The resulting similarity values are $S_{1,12}'$ for the similarity to a first centroid 405, $S_{2,2}'$ for a similarity to a second centroid 410 and $S_{3,2}'$ for a similarity to a third centroid 415. Each of the similarity values is below a similarity threshold, which causes a novelty rating associated with the data point 450 to satisfy a high novelty criterion. Additionally, a relevancy rating satisfies an update criterion for allocation of a new centroid. Accordingly, a new centroid is allocated at the data point 455. In some embodiments, the new centroid is allocated by or with reference to the closest existing centroid, which in this example is the third centroid 415. Additional new centroids may also be allocated by or with reference to other existing centroids. For example, first centroid 405 may cause another new centroid to be allocated at data point 450 using the stored information for data point 450. In some embodiments, each centroid determines a value of an update multiplier associated with that centroid when update criteria for centroid allocation are satisfied. These update multiplier values may be compared to an update multiplier threshold. Any centroids that have an associated update multiplier that is above the update multiplier threshold may allocate a new centroid. Those centroids having associated update multiplier values that are below the update multiplier threshold may not allocate new centroids.

In some embodiments, a single update multiplier is used for determining a magnitude of an update to make to a centroid as well as for determining whether to allocate a new centroid by an existing centroid. Alternatively, separate update multipliers may be used for determining the magnitude of an update to make to a centroid and for determining whether to allocate a new centroid by an existing centroid. When different update multipliers are used, those update multipliers may have different values, different reset values and/or different decay factors.

When subsequent data points are input into the perception node, those data points will be compared to the previous centroids 415, 420, 425 as well as to the new centroid at data point 455 (and possibly to the a new centroid at data point 450).

In one embodiment, a perception node sets a refractory period when a new centroid (or set of new centroids) is allocated for that perception node. The refractory period is a period during which the perception node is not permitted to allocate new centroids. The refractory period enables the application node to adjust weights associated with the new centroid to improve its use of the new centroid for generating accurate outputs. The refractory period additionally prevents the perception node from allocating too many new centroids in a short time span. In one embodiment, a refractory value of a perception node is set to 1 when a new centroid is allocated, and the refractory value is decayed geometrically over time until the refractory value is below a threshold. Once the refractory value is below the threshold (e.g., 0.01), the refractory period is over and the perception node may again allocate a new centroid. In one embodiment, the refractory value is decayed based on amount of time passed (e.g., based on processor cycles). In one embodiment, the refractory value is decayed based on number of data items processed, such that the refractory value is updated with each new processed data item. The refractory value may be decayed, for example, by multiplying the refractory value by some fraction (e.g., 0.9999) each cycle.

FIG. 5A is a graph illustrating an input signal received by a node of a machine learning architecture, in accordance with embodiments of the present disclosure. FIG. 5B is a graph illustrating error associated with an output signal of a second node of the machine learning architecture after the input signal of FIG. 5A has been processed, in accordance with embodiments of the present disclosure. As shown in FIG. 5A, the input signal is noise, followed by a sine wave, followed by more noise. The sine wave is divided into a sequence of input signals 505 at time $t_1$, 510 at time $t_2$, 520 at time $t_3$, 525 at time $t_4$ and 530 at time $t_5$. For input signals 505-525, the perception node identifies a high novelty, thus satisfying novelty criteria for node allocation. However, as shown in FIG. 5B, the error output in association with input signals 505-525 at times $t_1$-$t_4$ is 0. Accordingly, no new centroids are allocated at times $t_1$-$t_4$. However, for each of these input signals 505-525 a centroid that most closely matches the given input signal 505-525 records that input signal. In one embodiment, a centroid stores a single input signal. Accordingly, if the same centroid is the winning centroid for multiple input signals, then the most recent input signal may overwrite a previous input signal for that centroid.

The input signal 530 at time t5 (corresponding to the end of the sine wave) has a high novelty and is also associated with a high error (an error of 1). Accordingly, centroid allocation is triggered and a winning centroid that was closest to input signal 530 may trigger allocation of a new centroid having the values of the input signal 530. In some embodiments, other centroids may have been the winning centroids for previous input signals 505-525. One or more of these centroids may have stored the input signals 505-525 for which they were the winning centroid. These centroids may also trigger allocations of new centroids based on their respective stored input signals 505-525. Accordingly, multiple centroids may be allocated together to quickly develop centroids that will be usable to identify the sine wave over time. An associated application node may then be trained as a sequence detector that interprets the output of a perception node that includes these centroids. The machine learning system could then later be exposed to triangle waveforms, for example, and use the existing centroids and/or allocate new centroids to identify triangle waveforms.

Referring back to FIGS. 1-2B, the application node 130, 230 is charged with mapping the sparse feature vector(s) 131, 133 or 256A-D, 258A-C, 260A-B, 262 (or dense feature vectors) received from the perception nodes 116, 118 or 218A-D, 220A-C, 225A-B, 228 to the desired output space (e.g., using mapping component 135, 235). The output space may be a classification decision, a prediction signal (or signals), or an action to control or take place in some environment. To that end, the application node 130, 230 remains general and is not confined to a particular problem domain structure.

In one embodiment, the application node 130, 230 comprises a linear function of the feature elements from the sparse feature vector(s) (or dense feature vectors in some embodiments). Alternatively, a non-linear function may be used. Assuming N inputs and M outputs to the application system, the following linear mapping exists between the inputs and the outputs:

$$y_i = \sum_{j=1}^{N} X_j w_{ij} + b_i$$

where index i denotes the output signal (output element) index, index j denotes the input (feature element) signal index and $w_{ij}$ denotes a dedicated weight from input j to output i, $X_j$ denotes a value for a feature element j from a received sparse vector, $y_i$ denotes the value for a particular output element i, and $b_i$ denotes a constant associated with i.

This formulation implies that the mapping created by the application node 130, 230 is piecewise linear with respect to the function that is approximated. Moreover, assuming a sparse encoding of the input signals, only one signal from a given sparse feature vector is nonzero, which when denoted by j yields the simplified expression:

$$y_i = X_j w_{ij} + b_i$$

Let d(i) denote the target value for output i given a specific input to the application node. Furthermore, let's define the error for node i as the difference between the target and the output in one embodiment, such that:

$$e_i = d_i - y_i$$

In one embodiment, we derive the weight update rule for the weight associated with a nonzero feature value and the output for which the target exists using gradient descent. To do so, we minimize the negative gradient (partial derivative) of the squared error with respect to weight $w_{ij}$, such that:

$$w_{ij} = w_{ij} - \eta \frac{\partial e_i^2}{\partial w_{ij}} = w_{ij} + 2\eta e_i X_j$$

The above is a localized learning rule that correlates the error and the input with the weight change. Alternatively, if dense feature vectors are used, then a threshold may be applied, and updates to any weights that are below the threshold may be discarded to achieve a similar result.

The gradient descent used for updating the application node 130, 230 in embodiments does not involve deep (i.e. multiple-layer) propagation of gradients, and thus does not rely on a backpropagation-like optimization scheme, in contrast to traditional artificial neural networks training methodologies. Artificial neural networks typically use deep gradient descent and backpropagation to update every node in the artificial neural network for a given output error. This results in a heavily entangled state where every feature element of every node contributes to each output decision. In contrast, in embodiments an error (or other novelty rating) is broadcast directly to each node, and each node may determine whether or not to make any updates to its internal representations based on the error or other novelty rating.

In one embodiment, a single-layer linear transformation employed by the application node 130, 230 offers mitigation of forgetting effects and hence supports lifelong learning. If two different underlying patterns received by the perception node(s) yield disjoint (i.e. non-overlapping) representations exported to the application node 130, 230, forgetting is completely avoided given that updates to one class do not impact the other. This is because sparse feature vectors have one or a few non-zero values. Updates to weights in the application node 130, 230 are performed by multiplying values of feature elements by some value associated with the error in embodiments. However, if the value of a feature element is zero, then anything multiplied by that value is also zero, which results in no change to the weight associated with that feature element. Accordingly, only those feature elements with non-zero values are updated.

In one embodiment, a plasticity factor is applied to the weight update mechanism, such that weights that have undergone numerous changes will undergo very small changes in subsequent steps. This is done in order to stabilize the mapping learned so that future inputs don't distort previously learned inputs to output mappings. A possible interpretation of this plasticity modulation takes the form:

$$w_{ij} = w_{ij} - \eta \frac{\partial e_i^2}{\partial w_{ij}} p_{ij} = w_{ij} + 2\eta e_i X_j p_{ij}$$

where $p_{ij}$ is the plasticity term associated with weight $w_{ij}$.

One possible interpretation of the plasticity term will be to have each $p_{ij}$ be initiated to the value of 1. With each update to weight $w_{ij}$ said plasticity term will be decayed proportionally to the weight update magnitude. This will result in gradual decrease in the plasticity term thus decreasing the weight change magnitude.

As set forth above, the perception node(s) use a first update model and application node 130, 230 uses a second update model. The perception nodes of the perception subsystem 110, 210 and the application node 130, 230 of the application subsystem 115, 215 are co-trained using the above described methodologies. The co-training enables the perception subsystem 110, 210 to learn how best to generate representations that are usable by the application subsystem 115, 215 to generate accurate and meaningful outputs.

FIGS. 7-11 are flow diagrams illustrating methods for performing lifelong learning in a machine learning system, in accordance with embodiments of the present disclosure. The methods may be performed by processing logic that comprises hardware (e.g., circuitry, dedicated logic, programmable logic, microcode, etc.), software (e.g., instructions run on a processor), firmware, or a combination thereof. The methods may be performed, for example, by a computing device such as computing device 1200 executing a machine learning system 1280 of FIG. 12.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 7:
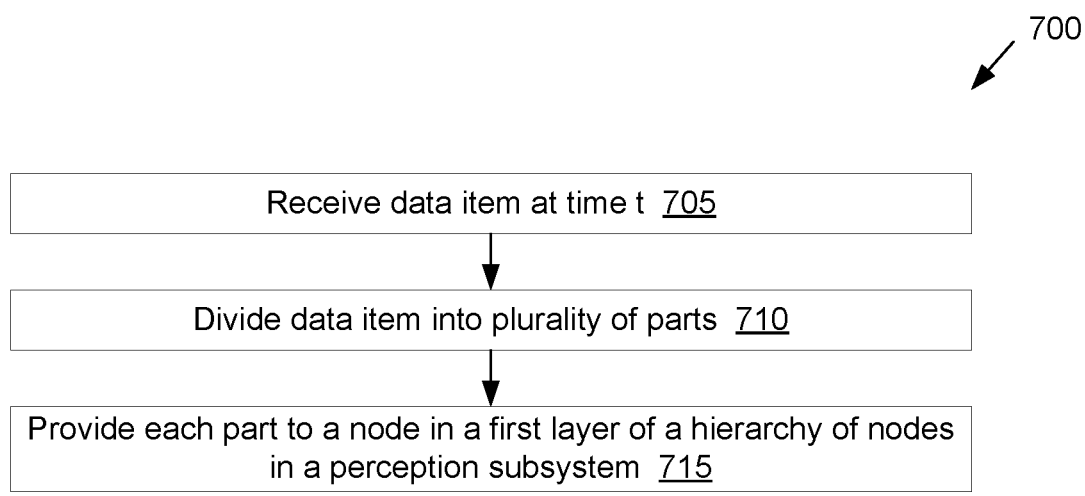
FIG. 7 is a flow diagram illustrating a method of partitioning a data item by a machine learning system, in accordance with embodiments of the present disclosure.

FIG. 7 is a flow diagram illustrating a method 700 of partitioning a data item by a machine learning system, in accordance with embodiments of the present disclosure. At block 705 of method 700, a machine learning system receives a data item at a time t. The machine learning system includes a perception subsystem comprising one or more perception nodes and an application subsystem comprising one or more application nodes, as described herein above. The data item may be any type of data, including an image, an audio file, a text document, software code, a stock quote, weather data, trajectory data, and so on. A nature of the data item may depend on what the machine learning system is being trained to do and/or what the machine learning system has been trained to do. For example, if the machine learning system is trained to classify images, then the data item may be an image. If the machine learning system has been trained to interpret speech, then the data item may consist of a sequence of acoustic feature vectors extracted from an audio file or audio stream.

In some embodiments, a previous data item was stored, and the received data item is compared to some criteria to determine whether to process that data item (e.g., whether to increment a clock cycle for a layer of the perception subsystem). In one embodiment, the received data item is compared to a previous data item, and a difference measure or similarity measure is determined based on a result of the comparison. If the distance is below a distance threshold (or the similarity is above a similarity threshold), then the current data item is very similar to the previous data item or data items, and may not generate a different result. Accordingly, it may not be worthwhile to process the current data item. In one embodiment, a moving average of distances between current input and previous input is maintained. If the moving average is below the distance threshold, then the most recent data item may not be processed. For example, each perception node may look for cumulative changes in its sequence of inputs. When there are enough cumulative changes detected by a perception node, then that perception node may advance its clock and process the new input. Similar operations may be performed by perception nodes at higher layers in the hierarchy of nodes as well based on cumulative changes between inputs for those perception nodes.

At block 710, processing logic divides the data item into a plurality of parts or portions. For example, a 2D image may be divided into a plurality of smaller 2D image patches or a 3D image may be divided into a plurality of smaller 3D image patches. In another example, an audio file may be divided into different portions, where each portion represents a different frequency range. The different portions may be overlapping or non-overlapping. Each of the portions of the data item may be considered a data point in a multi-dimensional space.

At block 715, processing logic provides each part or portion of the data item to a different node in a first layer of a hierarchy of nodes in the perception subsystem.

Figure 8:
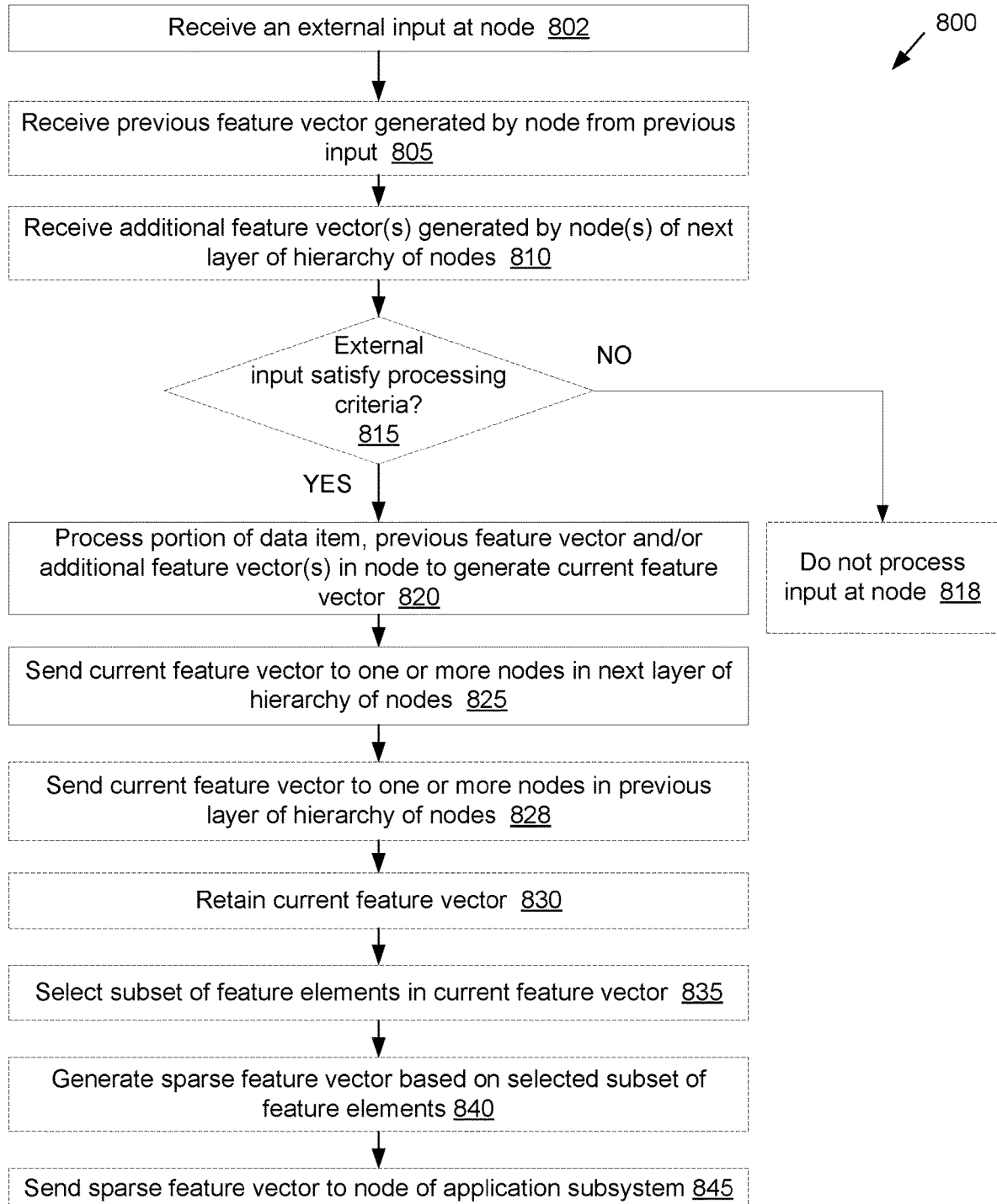
FIG. 8 is a flow diagram illustrating a method of processing an input by a perception node of a machine learning system, in accordance with embodiments of the present disclosure.

FIG. 8 is a flow diagram illustrating a method 800 of processing an input by a perception node of a machine learning system, in accordance with embodiments of the present disclosure. Method 800 may be performed by each perception node in the perception subsystem based on an input received at that node. For example, perception nodes at a lowest layer of the hierarchy of nodes may each receive a different portion of a data item produced in method 700. In embodiments, different perception nodes may be executed on different processing devices. Accordingly, the operations of perception nodes at different layers of the hierarchy of nodes may be pipelined.

At block 802, a perception node receives an external input. The external input may include a portion of a data item (for a lowest layer perception node) or feature vectors from one or more lower layer nodes (for perception nodes that are not at the lowest layer of the hierarchy of nodes). At block 805, the perception node may receive a previous feature vector that was generated by the perception node from a previous input. At block 810, the perception node may receive additional feature vectors generated by one or more perception nodes of a next layer of the hierarchy of nodes.

At block 815, the perception node may determine whether the received input (e.g., a combination of the external input, previous feature vector and/or additional feature vectors) satisfies a processing criteria. In one embodiment, the processing criteria is based on a similarity of the current input to one or more previous inputs. In one embodiment, the processing criteria is based on a cumulated similarity between received inputs.

For example, a previous input may have been stored, and a difference between the previous input and the current input may be compared to some criteria to determine whether to process that current input (e.g., whether to increment a clock cycle for the machine learning system at the current perception node and/or at a current layer of the hierarchy of nodes). In one embodiment, the received input is compared to a previous input, and a difference measure or similarity measure is determined based on a result of the comparison. If the distance is below a distance threshold (or the similarity is above a similarity threshold), then the current input is very similar to the previous input or inputs, and may not generate a different result. Accordingly, it may not be worthwhile to process the current input. In one embodiment, a moving average of distances between current input and previous input is maintained. If the moving average is below the distance threshold, then the most recent data item may not be processed.

If at block 815 a determination is made to process the received input, the method proceeds to block 820. If a determination is made not to process the received input, then the method proceeds to block 818 and the current input is not processed. The current input may then be stored for comparison to a subsequent input.

At block 820, the node of the perception subsystem processes a combined input that includes the external input (or a portion of the external input), and the previous feature vector (or a portion of the previous feature vector) and the one or more additional feature vectors (or portions of the one or more additional feature vectors). The perception node may include a set of centroids, and may compare the combined input to each of the centroids. The perception node may generate a current feature vector with a different feature element value associated with a similarity of the combined input to or distance of the combined input from each of the centroids. For example, if the perception node contains three centroids, then a generated feature vector may have a first feature element value associated with a distance from the first centroid, a second feature element value associated with a distance from the second centroid and a third feature element value associated with a distance from a third centroid.

In some embodiments, the algorithm used to compute the distance measure may weight different dimensions depending on whether those dimensions originate from a data item, from a previous feature vector generated by the perception node, or from one of the additional feature vectors. Such weighting may be used to either emphasize or deemphasize elements of the spatial patterns and/or temporal patterns. Such weighting may also be used to emphasize or deemphasize contextual information from higher layers and/or to emphasize or deemphasize data based on its recency. For example, an image may include many dimensions (e.g., on the order of tens, hundreds, thousands, etc.), and the current feature vector may have far fewer dimensions (e.g., 32, 64, etc.). The number of dimensions of the previous feature vector may be based on the number of centroids in the perception node. By increasing the weighting for the dimensions from the previous feature vector higher than dimensions from the data item, the temporal element represented in the current feature vector may be emphasized. Similar weighting may be applied to the dimensions associated with the additional feature vectors.

In some embodiments, to determine a distance to a centroid that centroid is partitioned into a first set of dimensions that are based on external input and a second set of dimensions based on previous feature vectors and/or the additional feature vectors. A first distance measure (or a first similarity sub-value) is computed between the first set of dimensions and the external input portion of the combined input and second distance measure (or a second similarity sub-value) is computed between the second set of dimensions and the previous feature vector and/or additional feature vector(s) portion of the combined input. The first distance and the second distance (or first and second similarity sub-values) may then be combined to arrive at the distance measure (or similarity measure).

At block 825, the perception node sends the current feature vector to one or more nodes in a next layer of the hierarchy of nodes (assuming the perception node is not at the highest layer in the hierarchy of nodes). Each of these perception nodes at the next layer may then perform method 800 to generate additional feature vectors, which they may pass on to perception nodes at a next layer, and so on. Optionally, the perception node may send the current feature vector to one or more perception nodes in a previous layer in the hierarchy of nodes at block 828.

Optionally, the perception node may retain the current feature vector at block 830 (e.g., to be used as an input to combine with a next external input received by that perception node). This enables the retained feature vector to be delayed by one or more time unit, and then fed back into the perception node together with a new external input (e.g., at time t+1). By combining the external input with a feature vector based on previous data items into a combined input, temporal and spatio-temporal regularities may be captured by the first node as well as spatial patterns.

At block 835, the perception node may select a subset of feature elements in the current feature vector having highest similarity values (or smallest distance values). In one embodiment, a winner-takes-all approach is used, and a single feature element with a highest feature element value is selected. Alternatively, two or more feature elements with highest values are selected.

At block 840, the perception node generates a sparse feature vector based on the selected subset of feature elements by replacing the non-selected values with zeros. In an example, the second feature vector may have the values (0.01, 0.12, 0.87). The feature element with the feature element value of 0.87 may be selected, and a sparse feature vector having the values (0,0,0.87) may be generated.

At block 845, the perception node may send the sparse feature vector to the application subsystem.

Figure 9:
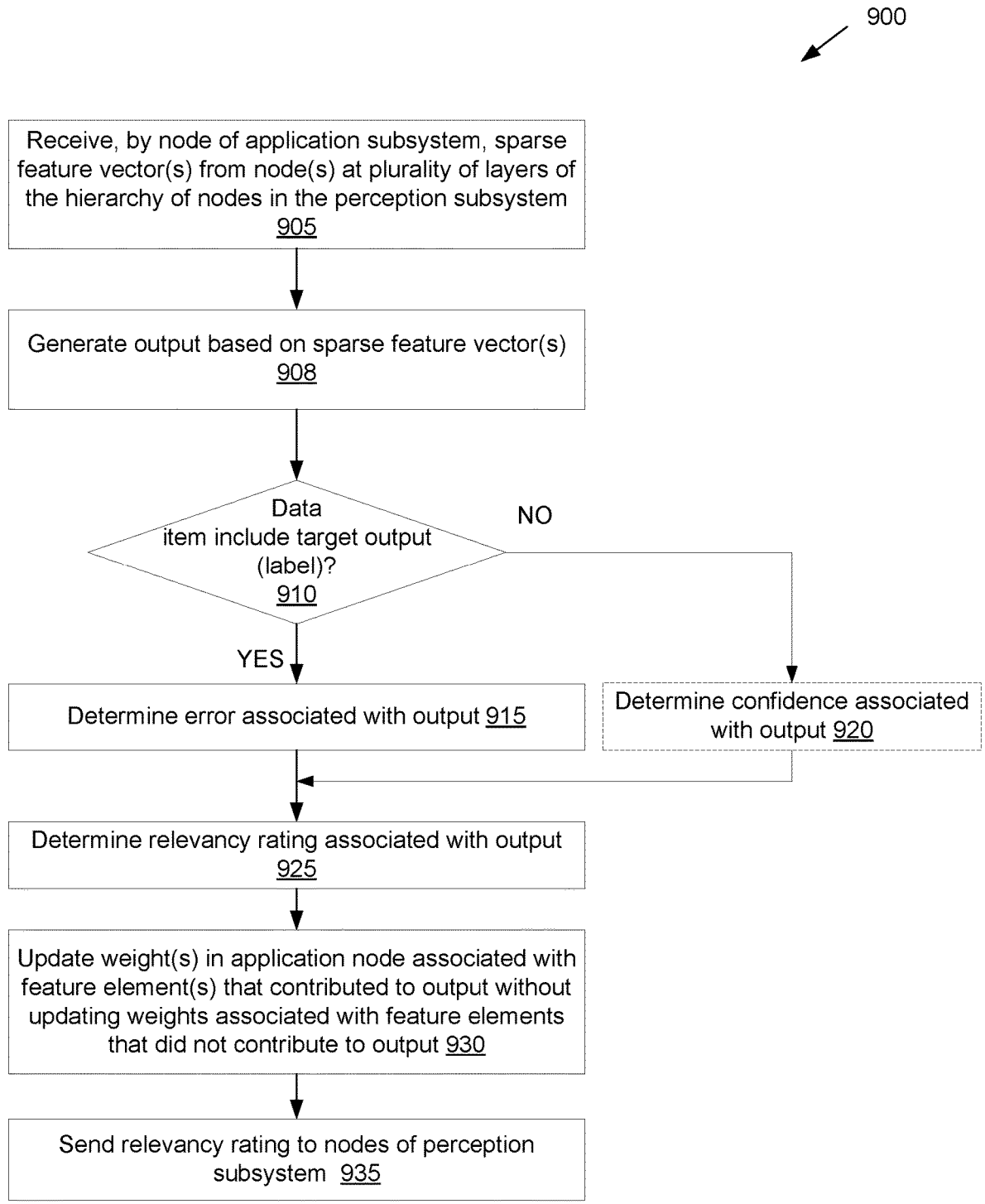
FIG. 9 is a flow diagram illustrating a method of determining an output by an application node of a machine learning system, in accordance with embodiments of the present disclosure.

FIG. 9 is a flow diagram illustrating a method 900 of determining an output by an application node of a machine learning system, in accordance with embodiments of the present disclosure. Method 900 may be performed by an application subsystem (e.g., one or more application nodes in an application subsystem). The application node(s) may execute on different processing devices than the perception nodes that execute method 800.

At block 905, the application node receives sparse feature vectors from multiple perception nodes in the perception subsystem. The application node may receive sparse feature vectors from perception nodes at a plurality of layers of the hierarchy of nodes in the perception subsystem. In some embodiments, the application node receives sparse feature vectors from perception nodes at a minimum layer of the hierarchy of layers and above.

At block 908, the application node processes the received sparse feature vectors to generate an output. As discussed herein above, many different types of outputs are possible, depending on what the machine learning system has been trained to do. Some example outputs include a classification of the data item, a prediction based on the data item, or a control action that affects some environment. Examples of control actions may include movement commands (e.g., to be made by a robotic system or automated vehicle), words or sentences (e.g., to be output by an internet bot), and so on.

The application node may apply the sparse feature vectors to a linear or non-linear function, as set forth above. The function may be used to determine a score or value for each output element, and may select an output element with a highest score as the output. Alternatively, an output may include a separate value for each output element.

In embodiments, the machine learning system does not have distinct training modes and inference modes. Instead, the machine learning system may continually learn while in a production environment using both inputs that include targets (e.g., labeled inputs) and inputs that lack targets (e.g., unlabeled inputs). The perception subsystem and the application subsystem may co-train in a lifelong learning paradigm, where the application subsystem continually learns to improve the accuracy of its outputs and the perception subsystem continually learns to produce representations (feature vectors) that enable the application system to accurately determine outputs.

At block 910, the application node may determine whether the received sparse feature vectors are associated with an input data item that included a target output (e.g., a label). If the data item associated with the sparse feature vectors included a target output, then an error may be calculated and used to update one or more nodes. If the data item does not include a target, then no error may be calculated. However, a confidence value may be determined even if there is no target, and the confidence value may be used to determine a relevancy. If the data item includes a target, the method continues to block 915. If the data item does not include a target, the method may proceed to block 920.

At block 915, processing logic determines an error for the output generated by the application node of the application subsystem. In one embodiment, the error is computed based on a difference between the target output and the generated output. In a further embodiment, the error is computed as an accumulation of errors across multiple data items. The accumulation may be an accumulated error within a moving window, for example. In a further embodiment, the error is computed as an accumulation of errors that is adjusted by a decay factor. The decay factor may reduce a current accumulation of errors at every interval (e.g., with every time increment or every new data item), for example. A few examples of error calculations are provided above.

At block 920, processing logic may compute a confidence associated with the output. The application node may be trained to generate a confidence score for each output that it generates. The confidence score may indicate a confidence that the output is a correct output.

At block 925, processing logic determines a relevancy rating associated with the generated output. The relevancy rating may be based on the error and/or the confidence. In some embodiments, the relevancy rating is based on a computed error. For example, the relevancy rating may be based on direct error, on accumulated error, or on some other function of error. In some embodiments, a relevancy rating may be computed even in the absence of an error value (e.g., in the absence of a target associated with the data item). If the data item did not include a target, and thus no error was computed, then the confidence score may be used as the relevancy rating or to determine the relevancy rating. For example, a high error may be correlated with a low confidence, and a low error may be correlated with a high confidence. Accordingly, a high error and/or a low confidence may result in a high relevancy, and a low error and/or a high confidence may result in a low relevancy. The relevancy rating may be determined globally for a data item and/or associated output such that the same relevancy rating is used for each perception node.

At block 930, processing logic updates weights in the application node associated with a feature element or feature elements that contributed to the output. The weights associated with feature elements that contributed to the output are updated without altering the weights associated with additional feature elements that did not contribute to the output. Those feature elements that did not contribute to the update have zero values. Accordingly, if a simple gradient descent update mechanism is used to update the weights of the second node, update values for each of the feature elements with zero values are multiplied by zero, resulting in no changes being made to the associated weights. Accordingly, the use of sparse feature vectors enables updates to weights of feature elements that are relevant to a particular output without updating weights of feature elements that are not relevant to that particular output. This prevents the application node from forgetting how to accurately produce other outputs while training the application node to accurately produce a first output. Some examples of update mechanisms for the second node have been discussed above.

At block 935, processing logic sends the relevancy rating to the perception nodes of the perception subsystem. The application subsystem may broadcast the relevancy rating to each of the perception nodes in each of the layers in the hierarchy of nodes. Each perception node may then make its own determination as to whether any centroids of that node should be updated. Note that the relevancy rating (e.g., an error) is not back propagated through any intermediate layers of nodes to get to the perception nodes in embodiments. Instead, the relevancy rating may be sent directly to each perception node in some embodiments. This may reduce or prevent entanglement between nodes with regards to their contribution to particular outputs.

Figure 10A:
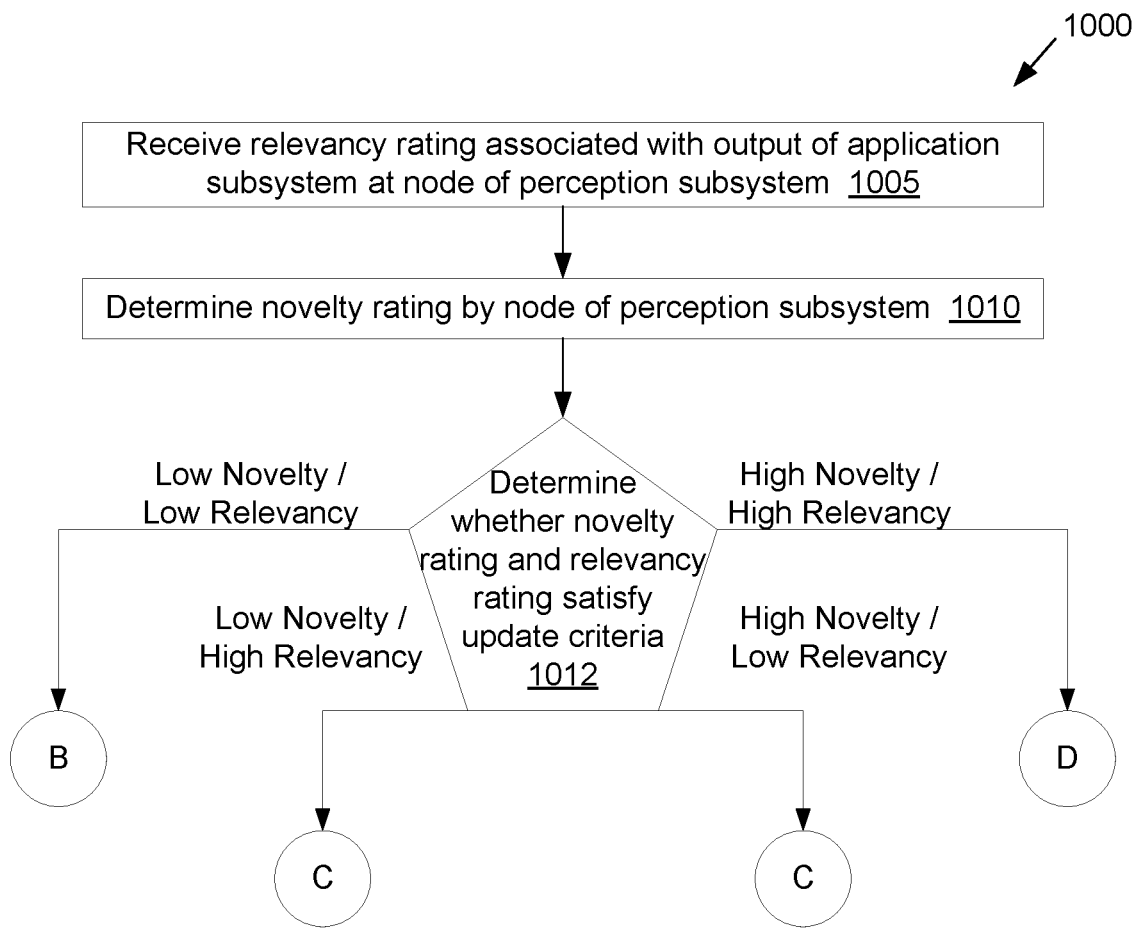
FIG. 10A is a flow diagram illustrating a method of determining whether to update a perception node of a machine learning system, in accordance with embodiments of the present disclosure.

FIG. 10A is a flow diagram illustrating a method 1000 of determining whether to update a perception node of a machine learning system, in accordance with embodiments of the present disclosure. Method 1000 may be performed by each perception node of the perception subsystem in the hierarchical machine learning systems described herein. For example, method 1000 may be performed by each perception node of machine learning system 105 or 202 after receiving a relevancy rating from the application subsystem (e.g., after method 900 is performed).

At block 1005, a perception node of the perception subsystem receives a relevancy rating associated with an output generated by the application subsystem. At block 1010, the perception node determines a novelty rating associated with the output and received relevancy rating.

At block 1012, processing logic then determines whether the relevancy rating and the novelty rating satisfy one or more update criteria. The update criteria may include one or more relevancy criteria as well as one or more novelty criteria. The relevancy criteria may include a first relevancy criterion for high relevancy and a second relevancy criterion for low relevancy. Similarly, the novelty criteria may include a first novelty criterion for high novelty and a second novelty criterion for low novelty.

In one embodiment, one or more relevancy thresholds are used to determine whether the relevancy rating is representative of a high relevancy or a low relevancy. The relevancy threshold (or thresholds) may be static thresholds or dynamic thresholds, as discussed in greater detail above. If the relevancy rating meets or exceeds a relevancy threshold, then a high relevancy may be determined. If the relevancy rating is below a relevancy threshold, then a low relevancy may be determined.

As mentioned, a relevancy rating may be determined for an input and associated output, and the same relevancy rating may be used by multiple different perception nodes. In contrast, each perception node may determine its own novelty rating for the input and/or output. In one embodiment, the novelty rating for a perception node is determined based on comparing the combined input to each centroid in the perception node and computing distances between the centroids and the combined input in a multi-dimensional space. Novelty may be determined based on one or more shortest distances (or highest similarities) that are computed between the combined input and a centroid. The novelty criteria may include a distance threshold (or similarity threshold). The one or more shortest distances may be compared to the distance threshold (or similarity threshold), and the combined input may be determined to have high novelty if the one or more shortest distances exceed or meet the distance threshold (or are equal to or less than the similarity threshold), and may be determined to have low novelty if the one or more distances are below the distance threshold (or are above the similarity threshold). The distance threshold (or similarity threshold) may be a static threshold or a dynamic threshold. Additionally, the distance threshold may be different for each node and/or for each centroid. In one embodiment, the distance threshold associated with a centroid is based on a standard deviation associated with that centroid (e.g., based on the data items that have been used to update that centroid).

Figure 10B:
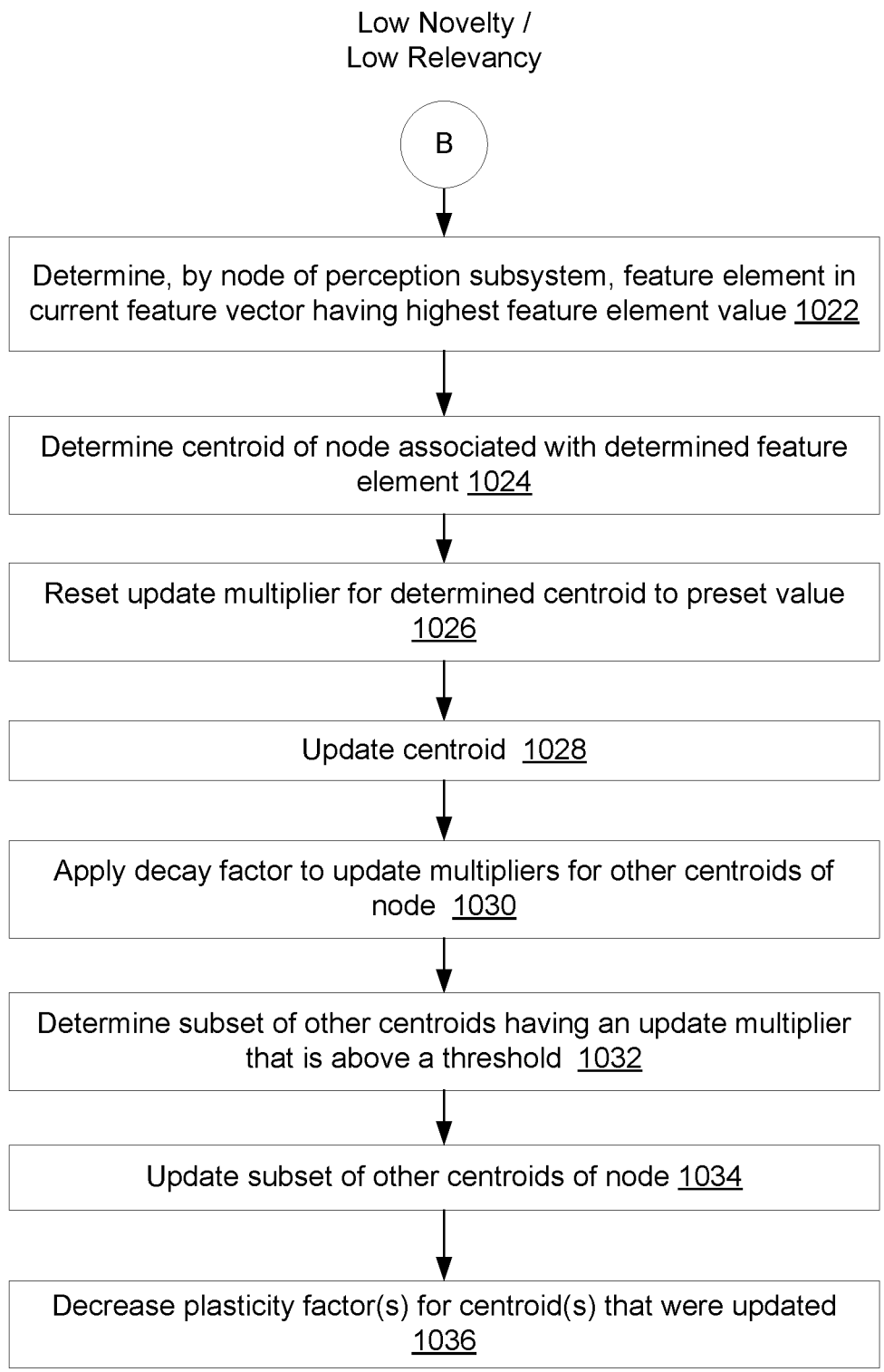
FIG. 10B is a flow diagram illustrating a method for updating one or more centroids of a perception node in a machine learning system, in accordance with embodiments of the present disclosure.

If at block 1012 it is determined that a data item has low novelty and low relevancy, the method continues to block 1022 shown in FIG. 10B. If it is determined that the data item has low novelty and high relevancy, the method continues to block 1042 shown in FIG. 10C. If it is determined that the data item has high novelty and low relevancy, the method continues to block 1042. If it is determined that the data item has high novelty and high relevancy, the method continues to block 1062 shown in FIG. 10D.

FIG. 10B is a flow diagram illustrating a branch of method 1000 that addresses updating one or more centroids of a perception node in a machine learning system, in accordance with embodiments of the present disclosure. At block 1022, the perception node determines a feature element in the current feature vector having a highest feature element value. Each feature element may correspond to a different centroid, and the feature element values may represent similarity between an input and a given centroid. The feature element with the highest feature element value is the feature element that is most similar to the input, and represents the "winning" centroid. Accordingly, at block 1024 processing logic determines a centroid of the perception node that is associated with the determined feature element.

At block 1026, processing logic resets an update multiplier (update eligibility factor) for the determined centroid to a preset value. In embodiments, the preset value is the highest value for the update multiplier. In one embodiment, the preset value is 1. The update multiplier may be used to adjust how much to update a centroid based on how recently that centroid was the winning centroid. By resetting the update multiplier for the currently winning centroid, that centroid will be updated by the highest possible amount.

At block 1028, processing logic updates the winning centroid of the perception node. The winning centroid may be updated by moving that centroid towards the combined input in the multi-dimensional space. The updated centroid may be a centroid associated with a feature element in the feature vector having a highest feature element value (e.g., highest similarity value). In one embodiment, the centroid is updated using an online clustering process, as described above.

At block 1030, processing logic applies a decay factor to the update multipliers of all other centroids of the perception node (e.g., those centroids that are not the winning centroid). The update multiplier may be decayed over time with each new input. Accordingly, a centroid that was a winning centroid 30 steps in the past may have been decayed to a value that is close to or approximately 0. However, a centroid that was recently the winning centroid (e.g., for an input that was received 2-8 steps in the past) may be updated. However, the magnitude of the update may be reduced.

At block 1032, processing logic may determine a subset of other centroids (those that are not presently the winning centroid) in the perception node having an update multiplier that is above a threshold. The threshold may be, for example, 0.1, 0.05, 0.01, 0.15, or some other value. At block 1034, processing logic updates the other centroids of the perception node. In one embodiment, all centroids of the perception node that have update multipliers that are over the threshold are candidates for update. Alternatively, the operation of block 1032 may be omitted, and all centroids in the perception node may be eligible for update. However, centroids having an update multiplier that is very small will undergo at most a marginal update. The update for each centroid of the perception node may be based on the input that is stored by that centroid modulated by one or more of a plasticity factor, an update multiplier, an error, and so on. By updating some or all centroids of the perception node, and modulating the updates based on the update multiplier, a trace of updates may be made. Centroids that were recently winners may be more relevant to the current output and so may be updated more than centroids that were less recently winners.

In some embodiments, the updated centroids are associated with plasticity factors that affect the magnitude of changes to those centroids. Each centroid may be associated with its own plasticity factor. At block 1036, the plasticity factors for the centroids in the perception node that were updated are decreased. In one embodiment, each plasticity factor is compared to a plasticity factor threshold prior to updating the associated centroid at block 1028 and/or 1034. If a plasticity factor is below the plasticity facture threshold, then no update is made to the centroid having that plasticity factor in one embodiment.

Figure 10C:
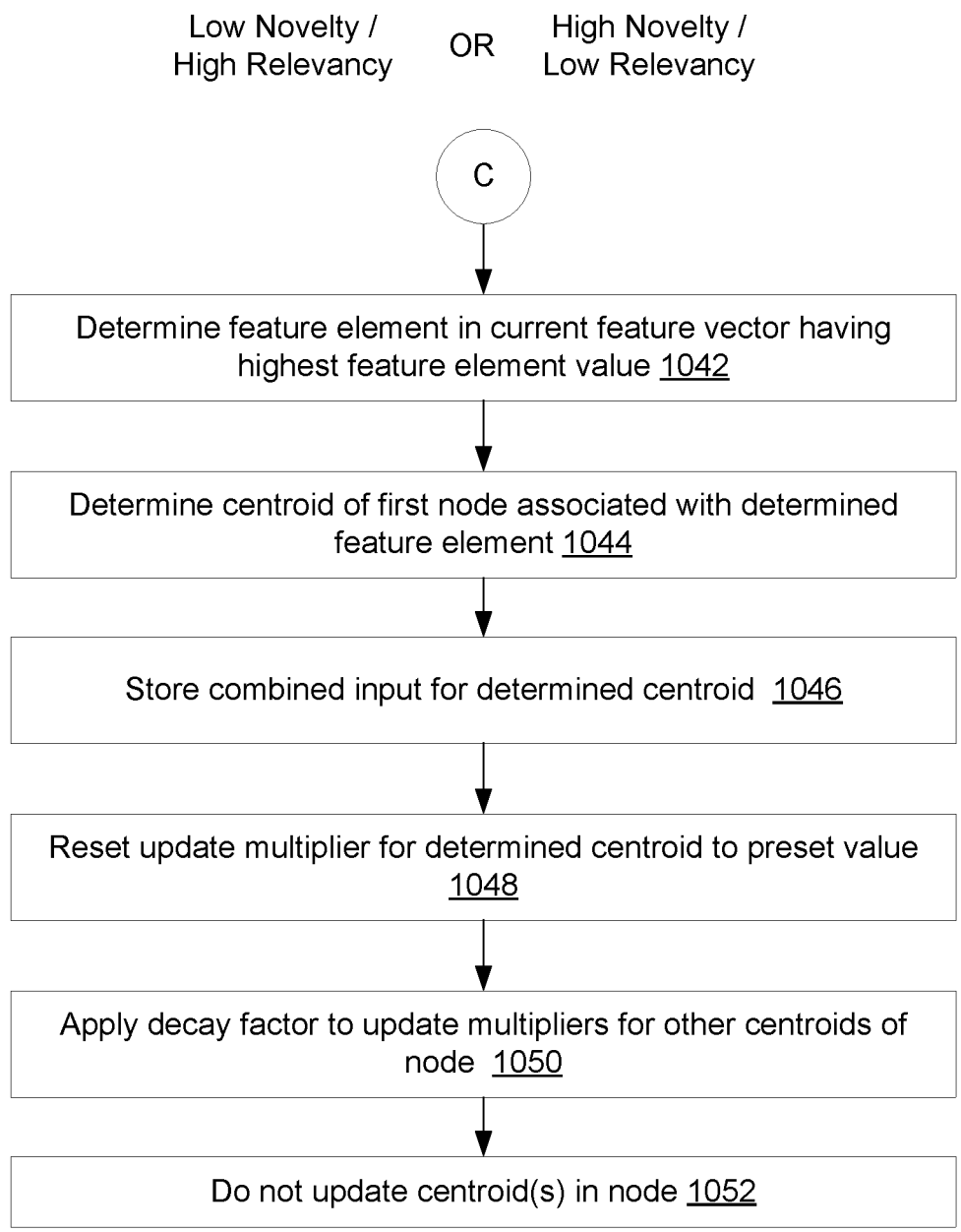
FIG. 10C is a flow diagram illustrating a method performed by a perception node of a machine learning system when update criteria are not satisfied, in accordance with embodiments of the present disclosure.

FIG. 10C is a flow diagram illustrating a branch of method 1000 that addresses operations performed by a perception node of a machine learning system when update criteria are not satisfied, in accordance with embodiments of the present disclosure. At block 1042, processing logic determines a feature element in the feature vector having a highest feature element value for a perception node. At block 1044, processing logic determines a centroid of the perception node associated with the determined feature element (the winning centroid). At block 1046, processing logic stores the combined input (e.g., comprising the external input, the previous feature vector generated by that perception node and/or additional feature vectors generated by perception nodes at a next layer in the hierarchy of perception nodes) for the determined centroid. At block 1048, processing logic resets the update multiplier for the determined centroid to the preset value. At block 1050, processing logic applies a decay factor to the update multipliers associated with each of the other centroids of the perception node (the non-winning centroids). At block 1052, no centroids of the perception node are updated since update criteria were not satisfied for that perception node.

Figure 10D:
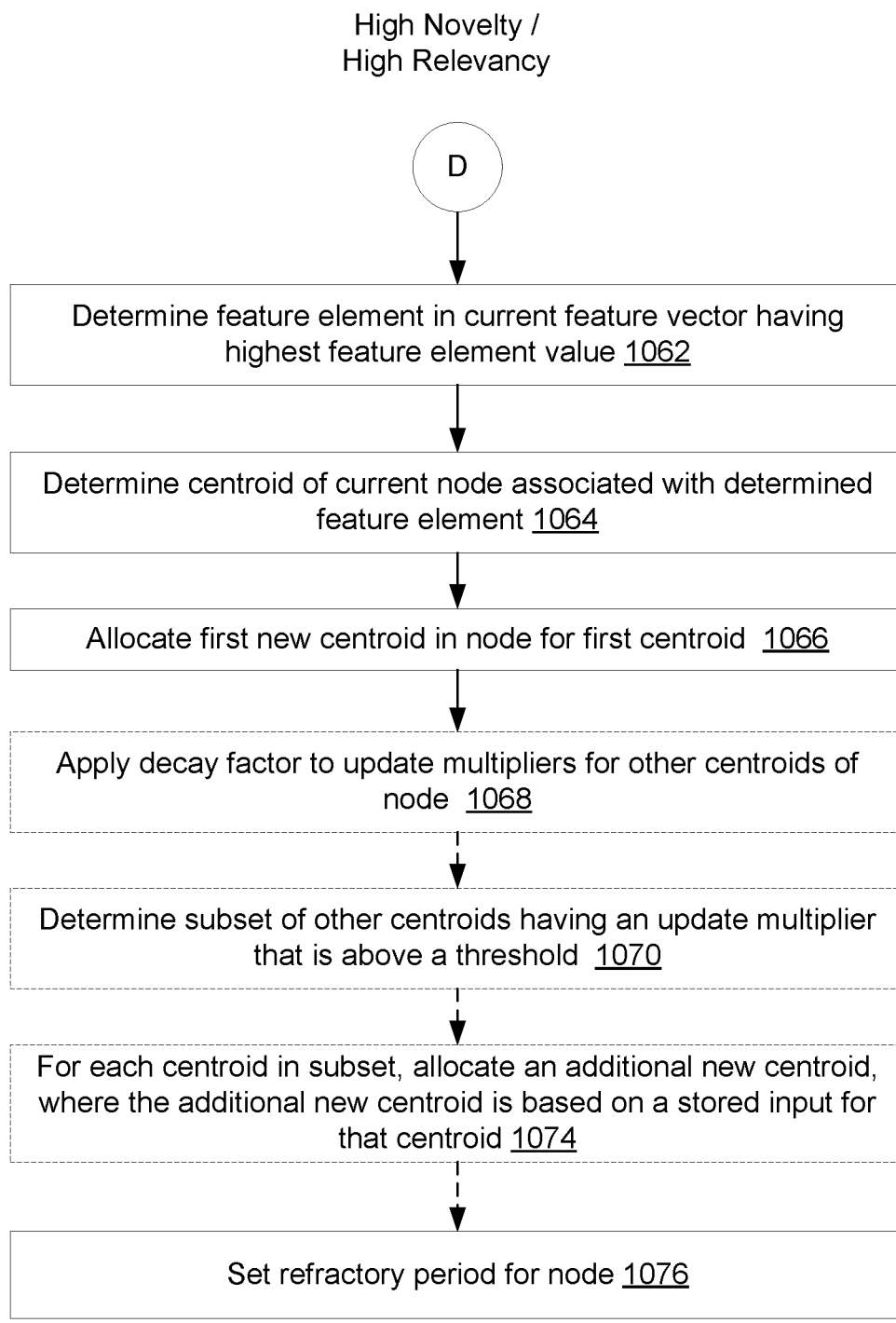
FIG. 10D is a flow diagram illustrating a method for allocating one or more centroids in a perception node in a machine learning system, in accordance with embodiments of the present disclosure.

FIG. 10D is a flow diagram illustrating a branch of method 1000 that addresses allocating one or more centroids in a perception node in a machine learning system, in accordance with embodiments of the present disclosure. At block 1062, processing logic determines a feature element in the current feature vector having a highest feature element value. At bock 1064, processing logic determines a centroid of the perception node associated with the determined feature element (the winning centroid). At block 1066, processing logic allocates a first new centroid in the perception node for the first centroid. The new centroid may have a position in a multi-dimensional space that is equal to the combined input (e.g., a combination of the external input, the previous feature vector generated by the perception node and/or additional feature vectors generated by perception nodes at a next higher layer in the hierarchy of perception nodes) in the multi-dimensional space.

At block 1068, processing logic may apply a decay factor to the update multipliers of other centroids (non-winning centroids) of the perception node. At block 1070, processing logic may determine a subset of other centroids having an update multiplier that is above a threshold. The threshold may be an allocation threshold. Some example allocation threshold values include 0.5, 0.8, 0.4, 0.6, or other value. Relevancy for each centroid may be proportional to that centroid's update multiplier (eligibility value). Those centroids with too low an update multiplier may not be relevant to the current output, and so may not warrant allocation of new centroids. In some embodiments, at block 1074, for each centroid in the subset, processing logic allocates an additional new centroid. Each additional new centroid that is generated for an existing centroid may be based on a previous input stored by that existing centroid. Alternatively, additional centroids may not be allocated at block 1074.

In one embodiment, at block 1076 processing logic sets a refractory period for the perception node. No new centroids may be added to the perception node during the refractory period.

As set forth above in methods 900 and 1000, different techniques are used for updating the application node and the perception nodes and different criteria are used to determine when perception nodes are to be updated and when application nodes are to be updated. By applying these different techniques and criteria, the perception subsystem and application subsystem may be co-trained in a manner that results in lifelong learning, localized learning and high sample efficiency. Additionally, the machine learning system is trained continuously with both data items that include targets and data items that do not include targets. Accordingly, the machine learning system achieves semi-supervised learning.

Figure 11:
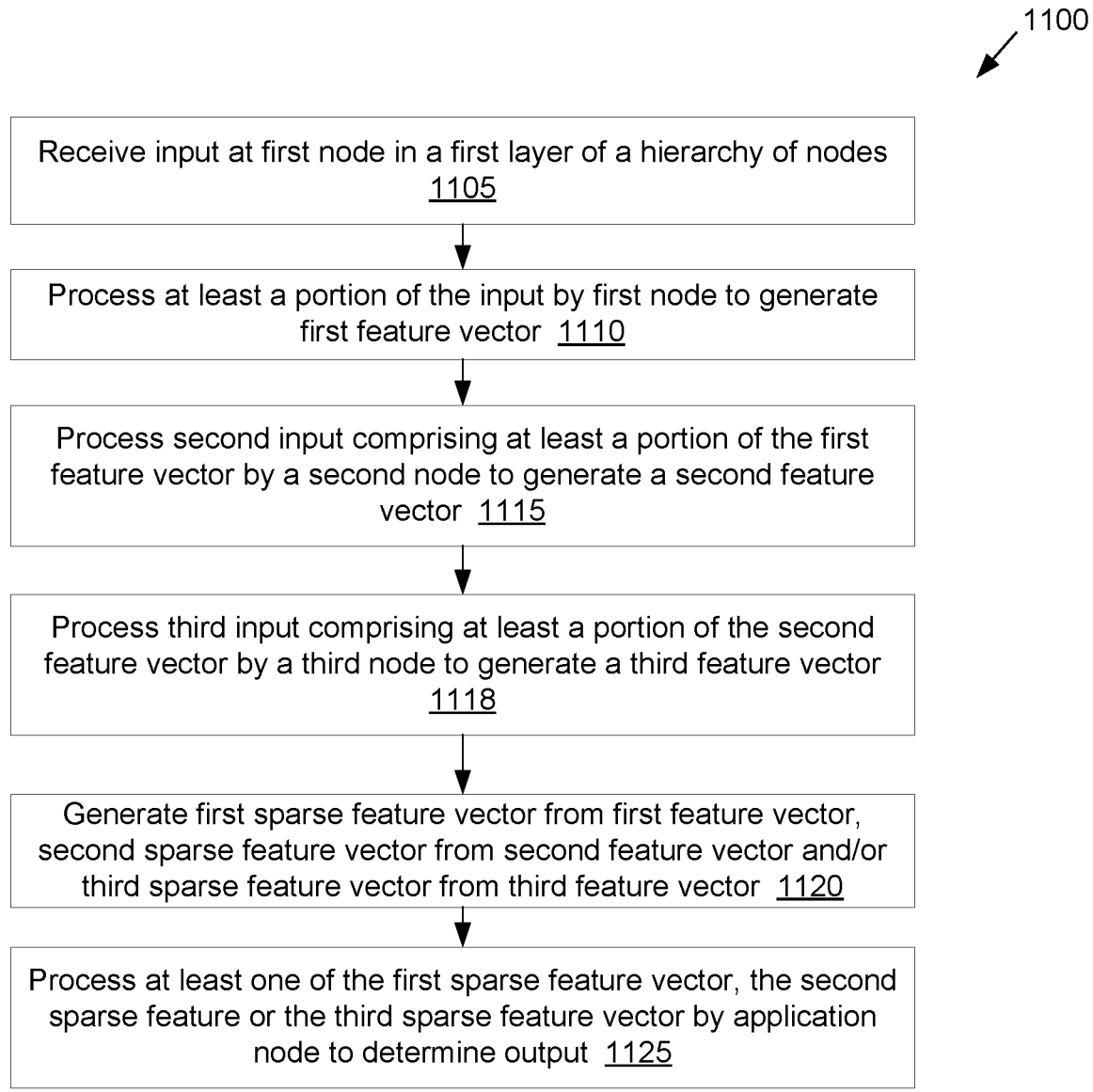
FIG. 11 is a flow diagram illustrating a method for performing lifelong learning in a hierarchical machine learning system, in accordance with embodiments of the present disclosure.

FIG. 11 is a flow diagram illustrating a method 1100 for performing lifelong learning in a hierarchical machine learning system, in accordance with embodiments of the present disclosure. At block 1105 of method 1100, processing logic receives an input at a first node in a first layer of a hierarchy of nodes. The input may include an external input (e.g., at least a portion of a data item or one or more feature vectors received from lower level nodes in the hierarchy of nodes), a feature vector previously generated by the first node and/or additional feature vectors generated by one or more higher level nodes in the hierarchy of nodes. The hierarchy of nodes may be part of a perception subsystem of a machine learning system. At block 1110, the first node processes at least a portion of the input to generate a first feature vector.

The first node may then provide the first feature vector to a second node at a second layer in the hierarchy of nodes. The second node may receive the first feature vector as well as other feature vectors from other nodes in the first layer of the hierarchy of nodes. The second node may additionally receive a feature vector previously generated by the second node and/or one or more additional feature vectors generated by one or more nodes at a third layer in the hierarchy of nodes. The first feature vector, other feature vectors received from nodes in the first layer, the feature vector previously generated by the second node and/or additional feature vectors received from one or more nodes at the next higher layer may constitute a second input for the second node. At block 1115, the second node processes the second input to generate a second feature vector.

The second node may then provide the second feature vector to a third node at a third layer in the hierarchy of nodes. The third node may receive the second feature vector as well as other feature vectors from other nodes in the second layer of the hierarchy of nodes. The third node may additionally receive a feature vector previously generated by the third node and/or one or more additional feature vectors generated by one or more nodes at a next higher layer in the hierarchy of nodes. The second feature vector, other feature vectors received from nodes in the second layer, the feature vector previously generated by the third node and/or additional feature vectors received from one or more nodes at the next higher layer may constitute a third input for the third node. At block 1118, the third node processes the third input to generate a third feature vector.

At block 1120, processing logic generates a first sparse feature vector from the first feature vector, a second sparse feature vector from the second feature vector and/or a third sparse feature vector from the third feature vector. For example, the second node may generate a sparse feature vector from the second feature vector and the third node may generate a sparse feature vector from the third feature vector. The first sparse feature vector, second sparse feature vector and/or third sparse feature vector may be provided to an application node of an application subsystem for the machine learning system.

At block 1125, the application node processes the first sparse feature vector, the second sparse feature vector and/or the third sparse feature vector to determine an output. The application node may additionally determine an error associated with the output and/or may determine a relevancy rating based on the error. The error and/or relevancy rating may then be used to update the application node and may be propagated to the first node, second node and third node. Each of the first, second and third nodes may determine a local novelty rating, and may then determine whether to update centroids within those nodes based on the relevancy rating and the local novelty rating determined for that node.

Figure 12:
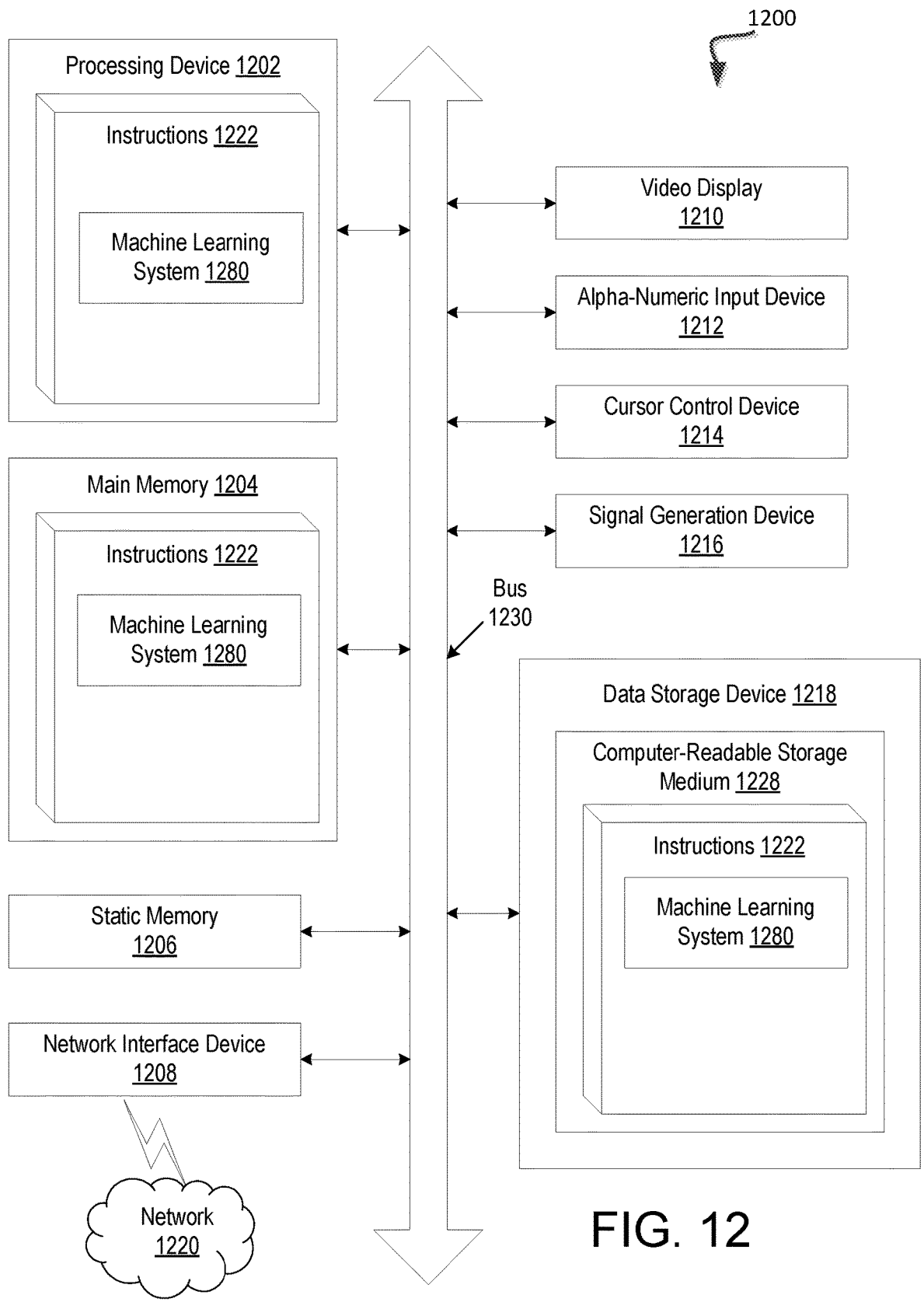
FIG. 12 is a block diagram illustrating an exemplary computer system, in accordance with embodiments of the present disclosure.

FIG. 12 illustrates a diagrammatic representation of a machine in the exemplary form of a computing device 1200 within which a set of instructions, for causing the machine to perform any one or more of the methodologies discussed herein, may be executed. The computing device 1200 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing device 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computing device 1200 may further include a network interface device 1208. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions of machine learning system 1280) embodying any one or more of the methodologies or functions described herein. Machine learning system 1280 may correspond to machine learning system 105 of FIG. 1 and/or machine learning system 205 of FIG. 2A in embodiments. The instructions 1222 may also reside, completely or at least partially, within the main memory 1204 and/or the processing device 1202 during execution thereof by the computer system 1200, the main memory 1204 and the processing device 1202 also constituting computer-readable media.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies described herein. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring embodiments of the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "processing", "receiving", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method for a machine learning system that mitigates catastrophic forgetting, comprising:
   receiving a first input at a first node in a first layer of a hierarchy of nodes;
   processing at least a portion of the first input by the first node to generate a first feature vector, the first feature vector comprising a first plurality of feature elements;
   processing a second input comprising at least a portion of the first feature vector by a second node in a second layer of the hierarchy of nodes to generate a second feature vector, the second feature vector comprising a second plurality of feature elements;
   generating a first sparse feature vector from the first feature vector, wherein a majority of feature elements in the first sparse feature vector have a value of zero;
   generating a second sparse feature vector from the second feature vector, wherein a majority of feature elements in the second sparse feature vector have a value of zero; and
   processing the first sparse feature vector and the second sparse feature vector by a third node to determine a first output.

2. The computer-implemented method of claim 1, wherein the second layer is a top layer of the hierarchy of nodes and the first layer is a second to top layer of the hierarchy of nodes.

3. The computer-implemented method of claim 1, wherein the first input further comprises at least a portion of a first previous feature vector that was generated by the first node based on a first previous input.

4. The computer-implemented method of claim 1, wherein the first input further comprises at least a portion of a second previous feature vector that was generated by the second node based on a second previous input comprising at least a portion of a first previous feature vector generated by the first node.

5. The computer-implemented method of claim 1, further comprising:
   receiving a data item at a bottom layer of the hierarchy of nodes, wherein the data item comprises a target, and wherein the first input and the second input are associated with the data item;
   determining an error associated with the first output based at least in part on a function of the first output and the target;
   determining a relevancy rating based at least in part on the error;
   determining whether the relevancy rating satisfies a relevancy criterion;
   determining a first novelty rating for the first node;
   determining whether the first novelty rating satisfies a novelty criterion; and
   updating the first node responsive to determining that the first novelty rating satisfies the novelty criterion and that the relevancy rating satisfies the relevancy criterion.

6. The computer-implemented method of claim 5, further comprising:
   determining a second novelty rating for the second node;
   determining whether the second novelty rating satisfies the novelty criterion; and
   updating the second node responsive to determining that the second novelty rating satisfies the novelty criterion and that the relevancy rating satisfies the relevancy criterion.

7. The computer-implemented method of claim 5, wherein the novelty criterion comprises a novelty threshold, the relevancy rating comprises a relevancy threshold, and the first node comprises a plurality of centroids, the method further comprising:
   determining that the first novelty rating is below the novelty threshold and that the relevancy rating is below the relevancy threshold; and
   updating a first centroid of the plurality of centroids in the first node, wherein the first centroid is associated with a first feature element of the first feature vector having a highest value.

8. The computer-implemented method of claim 5, wherein the novelty criterion comprises a novelty threshold, the relevancy rating comprises a relevancy threshold, and the first node comprises a plurality of centroids, the method further comprising:
   determining that the first novelty rating is above the novelty threshold and that the relevancy rating is above the relevancy threshold; and
   allocating a first new centroid for the first node, the first new centroid having values based on the first input.

9. The computer-implemented method of claim 1, further comprising:
   determining whether update criteria are satisfied for the first node;
   separately determining whether the update criteria are satisfied for the second node; and
   updating at least one of the first node or the second node.

10. The computer-implemented method of claim 1, wherein the first node and the second node are components of a hierarchical perception subsystem of a machine learning system and wherein the third node is a component of an application subsystem of the machine learning system, the method further comprising:

co-training the perception subsystem and the application subsystem based on labeled data items and unlabeled data items, wherein a first function is used to train nodes in the hierarchical perception subsystem and a second function is used to train nodes in the application subsystem.

11. A non-transitory computer readable medium comprising instructions that, when executed by a processing device, cause the processing device to perform operations comprising:

receiving, by a first subsystem of a machine learning system that mitigates catastrophic forgetting, a first sparse feature vector from a first node in a second subsystem of the machine learning system, wherein the first node is included in a first layer of a hierarchy of nodes in the second subsystem, and wherein the first sparse feature vector was generated in response to the second subsystem receiving a data item;

receiving, by the first subsystem, a second sparse feature vector from a second node in the second subsystem, wherein the second node is included in a second layer of the hierarchy of nodes, and wherein the second sparse feature vector was generated in response to the second subsystem receiving the data item; and mapping the first sparse feature vector and the second sparse feature vector into an output space of possible outputs to generate an output associated with the data item.

12. The non-transitory computer readable medium of claim 11, the operations further comprising:

determining that the data item is associated with a target output;

making a comparison between the output and the target output;

determining an error associated with the output based on the comparison;

sending at least one of the error or a relevancy rating associated with the error to the first node in the first layer; and sending at least one of the error or the relevancy rating associated with the error to the second node in the second layer.

13. The non-transitory computer readable medium of claim 12, the operations further comprising:

determining one or more feature elements of the first sparse feature vector that contributed to the output;

determining one or more feature elements of the second sparse feature vector that contributed to the output; and updating one or more weights in a third node of the first subsystem that are associated with at least one of a) the one or more feature elements of the first sparse feature vector that contributed to the output orb) the one or more feature elements of the second sparse feature vector that contributed to the output, wherein weights associated with feature elements that did not contribute to output are not updated.

14. The non-transitory computer readable medium of claim 13, wherein a majority of feature elements in the first sparse feature vector have a zero value, wherein a majority of feature elements in the second sparse feature vector have a zero value, and wherein the one or more feature elements of the first sparse feature vector and the second sparse feature vector having a zero value did not contribute to the output.

15. The non-transitory computer readable medium of claim 12, the operations further comprising:

determining whether the relevancy rating satisfies a relevancy criterion;

determining a first novelty rating for the first node;

determining whether the first novelty rating satisfies a novelty criterion; and updating the first node responsive to determining that the relevancy rating satisfies the relevancy criterion and that the first novelty rating satisfies a novelty criterion.

16. The non-transitory computer readable medium of claim 15, the operations further comprising:

determining a second novelty rating for the second node;

determining whether the second novelty rating satisfies the novelty criterion; and updating the second node responsive to determining that the relevancy rating satisfies the relevancy criterion and that the second novelty rating satisfies the novelty criterion.

17. The non-transitory computer readable medium of claim 16, wherein the first novelty rating is determined based at least in part on a first input used by the first node to generate the first sparse feature vector, and wherein the second novelty rating is determined based at least in part on a second input used by the second node to generate the second sparse feature vector.

18. The non-transitory computer readable medium of claim 11, wherein the second layer is a top layer of the hierarchy of nodes, wherein the first layer is a second to top layer of the hierarchy of nodes, and wherein the first subsystem does not receive a sparse feature vector from a bottom layer of the hierarchy of nodes.

19. The non-transitory computer readable medium of claim 11, wherein the data item is associated with a target output, the operations further comprising:

determining that the target output is not included in the output space;

expanding the output space to include the target output associated with the data item; and updating at least one of the first node or the second node to accommodate the target output.

20. The non-transitory computer readable medium of claim 19, wherein the first subsystem is a classifier, wherein the target output comprises a new classification, wherein prior to the updating the output space does not include the new classification, and wherein after the updating the output space does include the new classification.

21. The non-transitory computer readable medium of claim 19, wherein the second node comprises a plurality of centroids, and wherein updating the second node comprises adding a new centroid to the second node based on an input used by the second node to generate the second sparse feature vector.

22. A computing device comprising:

a memory comprising instructions for a machine learning system that mitigates catastrophic forgetting, wherein the machine learning system comprises a first subsystem and a second subsystem, and wherein the first subsystem comprises a hierarchy of nodes; and a processing device operatively connected to the memory, wherein execution of the instructions by the processing device causes the processing device to:

receive a first input at a first node of the first subsystem, wherein the first node is in a first layer of the hierarchy of nodes;

process at least a portion of the first input by the first node to generate a first feature vector, the first feature vector comprising a first plurality of feature elements;

receive a second input at a second node of the first subsystem, wherein the second node is in a second layer of the hierarchy of nodes, and wherein the second input comprises at least a portion of the first feature vector;

process the second input by the second node to generate a second feature vector, the second feature vector comprising a second plurality of feature elements;

generate a first sparse feature vector from the first feature vector, wherein a majority of feature elements in the first sparse feature vector have a value of zero;

generate a second sparse feature vector from the second feature vector, wherein a majority of feature elements in the second sparse feature vector have a value of zero; and receive the first sparse feature vector and the second sparse feature vector by a third node of the second subsystem; and process the first sparse feature vector and the second sparse feature vector by the third node to determine a first output.

\* \* \* \* \*